US009928406B2

(12) United States Patent
Bhanu et al.

(10) Patent No.: US 9,928,406 B2
(45) Date of Patent: Mar. 27, 2018

(54) UNIFIED FACE REPRESENTATION FOR INDIVIDUAL RECOGNITION IN SURVEILLANCE VIDEOS AND VEHICLE LOGO SUPER-RESOLUTION SYSTEM

(71) Applicant: THE REGENTS OF THE UNIVERSITY OF CALIFORNIA, Oakland, CA (US)

(72) Inventors: Bir Bhanu, Riverside, CA (US); Le An, Riverside, CA (US); Ninad Thakoor, Riverside, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 952 days.

(21) Appl. No.: 14/042,873

(22) Filed: Oct. 1, 2013

(65) Prior Publication Data
US 2016/0217319 A1 Jul. 28, 2016

Related U.S. Application Data

(60) Provisional application No. 61/708,579, filed on Oct. 1, 2012, provisional application No. 61/708,589, filed on Oct. 1, 2012.

(51) Int. Cl.
G06K 9/00 (2006.01)
G06K 9/62 (2006.01)
G06K 9/46 (2006.01)

(52) U.S. Cl.
CPC ..... G06K 9/00288 (2013.01); G06K 9/00281 (2013.01); G06K 9/00315 (2013.01);
(Continued)

(58) Field of Classification Search
None
See application file for complete search history.

(56) References Cited

U.S. PATENT DOCUMENTS 7,421,097 B2* 9/2008 Hamza ............... G06K 9/00288
235/382
8,705,810 B2* 4/2014 Wang ............... G06F 17/30781
382/103
(Continued)

OTHER PUBLICATIONS

Yang et al., "Facial expression recognition Using emotion avatar image", Conference on FG 2011, Mar. 21-25, 2011.*
(Continued)

Primary Examiner — Soo Park
(74) Attorney, Agent, or Firm — Buchanan Ingersoll & Rooney PC

(57) ABSTRACT

A new image-based representation and an associated reference image is disclosed called the emotion avatar image (EAI), and the avatar reference, respectively, which leverages the out-of-plane head rotation. The method is not only robust to outliers but also provides a method to aggregate dynamic information from expressions with various lengths. The approach to facial expression analysis can consist of the following steps: 1) face detection; 2) face registration of video frames with the avatar reference to form the EAI representation; 3) computation of features from EAI using both local binary patterns and local phase quantization; and 4) the classification of the feature as one of the emotion type by using a linear support vector machine classifier.

17 Claims, 18 Drawing Sheets

(52) U.S. Cl.
CPC ....... *G06K 9/6206* (2013.01); *G06K 9/00241* (2013.01); *G06K 9/00785* (2013.01); *G06K 9/6212* (2013.01); *G06K 2009/4666* (2013.01); *G06K 2209/23* (2013.01)

(56) References Cited

U.S. PATENT DOCUMENTS

| | | | | |
|---|---|---|---|---|
| 8,848,068 | B2* | 9/2014 | Pfister | G06K 9/00315 |
| | | | | 348/222.1 |
| 9,613,258 | B2* | 4/2017 | Chen | G06K 9/00275 |
| 2002/0102024 | A1* | 8/2002 | Jones | G06K 9/00248 |
| | | | | 382/225 |
| 2003/0063781 | A1* | 4/2003 | Philomin | G06K 9/00288 |
| | | | | 382/118 |
| 2004/0240708 | A1* | 12/2004 | Hu | G06F 3/012 |
| | | | | 382/103 |
| 2006/0120571 | A1* | 6/2006 | Tu | G06K 9/00281 |
| | | | | 382/118 |
| 2011/0091113 | A1* | 4/2011 | Ito | G06K 9/00248 |
| | | | | 382/197 |

OTHER PUBLICATIONS

Yang et al., "Understanding discrete facial expressions in video using an emotion avatar image", IEEE Transactions on Systems, Man, and Cybernetics, Part B (Cybernetics), vol. 42, issue 4, Aug. 2012.*
Liu et al., "SIFT flow: dense correspondence across scenes and its applications", in IEEE Transactions on Pattern Analysis and Machine Intelligence, vol. 33, No. 5, pp. 978-994, May 2011.*
Yuan et al., "Combining local binary pattern and local phase quantization for face recognition", 2012 International Symposium on Biometrics and Security Technologies, Taipei, 2012, pp. 51-53.*
Tan et al., "Enhanced local texture feature sets for face recognition under difficult lighting conditions", in IEEE Transactions on Image Processing, vol. 19, No. 6, pp. 1635-1650, Jun. 2010.*
Zhang et al., "Face Recognition from a Single Training Image under Arbitrary Unknown Lighting using Spherical Harmonics," IEEE Transactions on Pattern Analysis and Machine Intelligence, Mar. 2006, pp. 351-363, vol. 28, No. 3, IEEE Computer Society.
Xie et al., "On Channel Reliability Measure Training for Multi-Camera Face Recognition," IEEE Workshop on Applications of Computer Vision (WACV'07), 2007, pp. 1-6, IEEE Computer Society.
Wong et al., "Patch-Based Probabilistic Image Quality Assessment for Face Selection and Improved Video-based Face Recognition," pp. 74-81, The University of Queensland, School of ITEE, Australia.
Vu et al., "Enhanced Patterns of Oriented Edge Magnitudes for Face Recognition and Image Matching," IEEE Transactions on Image Processing, Mar. 2012, pp. 1352-1365, vol. 21, No. 3, IEEE.
Tsai et al., "Two-View Face Recognition using Bayesian Fusion," Proceedings of the 2009 IEEE International Conference on Systems, Man and Cybernetics, Oct. 2009, pp. 157-164, IEEE, San Antonio, TX USA.
Tan et al., "Enhanced Local Texture Feature Sets for Face Recognition under Difficult Lighting Conditions," IEEE Transactions on Image Processing, Jun. 2010, pp. 1635-1650, vol. 19, No. 6, IEEE.
Thomaz et al., "A New Ranking Method for Principal Components Analysis and its Application to Face Image Analysis," Image and Vision Computing, 2010, pp. 902-913, vol. 28, Elsevier B.V.
Stallkamp et al., "Video-Based Face Recognition on Real-World Data," 2007, pp. 1-8, University of Karlsruhe, Germany, IEEE.
Shen et al., "A Review on Gabor Wavelets for Face Recognition," Pattern Anal Applic, 2006, pp. 273-292, vol. 9, Springer-Verlag London Limited.
Sharma et al., "Bypassing Synthesis: PLS for Face Recognition with Pose, Low-Resolution and Sketch," pp. 593-600, Institute of Advanced Computer Science, University of Maryland, USA.
Lui et al., "A Meta-Analysis of Face Recognition Covariates," 2009, pp. 1-8, IEEE.
Lowe, "Distinctive Image Features from Scale-Invariant Keypoints," International Journal of Computer Vision, 2004, pp. 91-110, vol. 60, No. 2, Kluwer Academic Publishers, The Netherlands.
Liu et al., "SIFT Flow: Dense Correspondence across Scenes and its Applications," IEEE Transactions on Pattern Analysis and Machine Intelligence, May 2011, pp. 978-993, vol. 33, No. 5, IEEE Computer Society.
Li et al., "An Integrated 3D Face-Expression Recognition Approach," 2006, pp. 1132-1135, Electrical & Computer Engineering Department, Florida International University, IEEE.
Hennings-Yeomans et al., "Simultaneous Super-Resolution and Feature Extraction for Recognition of Low-Resolution Faces," pp. 1-8.
Harguess et al., "Fusing Face Recognition from Multiple Cameras," 2009, pp. 1-7, Computer & Vision Research Center / Department of ECE, Department of Electrical & Computer Engineering, The University of Texas at Austin, IEEE.
Harguess et al., "A Case for the Average-Half Face in 2D and 3D for Face Recognition," 2009, pp. 7-12, Computer & Vision Research Center / Department of ECE, Department of Electrical & Computer Engineering, The University of Texas at Austin, IEEE.
Grgic et al., "SCface—Surveillance Cameras Face Database," Mutitimed Tools Appl, 2011, pp. 863-879, vol. 51, Springer Science + Business Media, LLC.
Blanz et al., "Face Recognition Based on Fitting a 3D Morphable Model," IEEE Transactions on Pattern Analysis and Machine Intelligence, Sep. 2003, pp. 1063-1074, vol. 25, No. 9, IEEE Computer Society.
Biswas et al., "Face Recognition in Low-Resolution Videos using Learning-Based Likelihood Measurement Model," 2011, pp. 1-7, Department of Computer Science and Engineering, University of Notre Dame, Notre Dame, IEEE.
Arandjelovic et al., "A Manifold Approach to Face Recognition from Low Quality Video Across Illumination and Pose using Implicit Super-Resolution," pp. 1-8, University of Cambridge, Cambridge.
Ahonen et al., "Recognition of Blurred Faces using Local Phase Quantization," pp. 1-4, Machine Vision Group, University of Oulu, Finland.
Ahonen et al., "Face Recognition with Local Binary Patterns," 2004, pp. 469-481, Machine Vision Group, Infotech Oulu, University of Oulu, Finland, Springer-Verlag Berlin Heidelberg.
"Challenge Data" pp. 1.
Valstar et al., "FG 2011 Facial Expression Recognition and Analysis Challenge (FERA2011)," 2011, pp. 1-3.
Bassili, "Emotion Recognition: The Role of Facial Movement and the Relative Importance of Upper and Lower Areas of the Face," Journal of Personality and Social Psychology, 1979, pp. 2049-2058, vol. 37, No. 11, American Psychological Association, Inc.
Chang et al., "LIBSVM: A Library for Support Vector Machines," 2001, pp. 1-39, Department of Computer Science, National Taiwan University, Taipei, Taiwan.
Cruz et al., "A Psychologically-Inspired Match-Score Fusion Model for Video-Based Facial Expression Recognition," 2011. pp. 341-350, Center for Research in Intelligent Systems, University of California, Riverside, California, Springer-Verlag Berlin Heidelberg.
Han et al., "Individual Recognition using Gait Energy," IEEE Transactions on Pattern Analysis and Machine Intelligence, Feb. 2006, pp. 316-322, vol. 28, No. 2, IEEE Computer Society.
Viola et al., "Robust Real-Time Face Detection," International Journal of Computer Vision, 2004, pp. 137-154, vol. 57, No. 2, Kluwer Academic Publishers, The Netherlands.
Baltrusaitis et al., "Real-Time Inference of Mental States from Facial Expressions and Upper Body Gestures," pp. 909-914, Google, Inc.
Meng et al., "Support Vector Machine to Synthesise Kernels," Machine Learning Workshop, 2005, pp. 242-255, School of Electronics and Computer Science, University of Southampton, Southampton, United Kingdom, Spinger-Verlag Berlin Heidelberg.

(56) References Cited

OTHER PUBLICATIONS

Valstar et al., "The First Facial Expression Recognition and Analysis Challenge," pp. 921-926.
Chew et al., "Person-Independent Facial Expression Detection using Constrained Local Models," pp. 915-920.
Srivastava et al., "Accumulated Motion Images for Facial Expression Recognition in Videos," pp. 903-908.
Dahmane et al., "Emotion Recognition using Dynamic Grid-Based HoG Features," pp. 884-888.
Meng et al., "Emotion Recognition by Two View SVM_2K Classifier on Dynamic Facial Expression Features," pp. 854-859, University College London, London, United Kingdom.
Littlewort et al., "The Motion in Emotion—A CERT Based Approach to the FERA Emotion Challenge," pp. 897-902, Machine Perception Laboratory, Institute for Neural Computation, University of California, San Diego, USA.
Dhall et al., Emotion Recognition using PHOG and LPQ Features, pp. 878-883.
Tariq et al., "Emotion Recognition from an Ensemble of Features," pp. 872-877.
Gehrig et al., "A Common Framework for Real-Time Emotion Recognition and Facial Action Unit Detection," pp. 1-6, Facial Image Processing and Analysis Group, Institute of Anthropomatics, Karlsruhe Institute of Technology, Germany.
Lowe, "Object Recognition from Local-Scale-Invariant Features," pp. 1-8, Computer Science Department, University of British Columbia, Vancouver, B.C.
Zhou et al., "Unsupervised Discovery of Facial Events," pp. 2574-2581, IEEE.
Tian et al., "Recognizing Action Units for Facial Expression Analysis," IEEE Transactions on Pattern Analysis and Machine Intelligence, Feb. 2001, pp. 97-115, vol. 23, No. 2, IEEE.
Bartlett et al., "Fully Automatic Facial Action Recognition in Spontaneous Behavior," Proceedings of the 7th International Conference on Automatic Face and Gesture Recognition (FGR '06), 2006, pp. 1-6, IEEE Computer Society.
Pantic et al., "Dynamics of Facial Expression: Recognition of Facial Actions and Their Temporal Segments from Face Profile Image Sequences," IEEE Transactions on Systems, Man and Cybernetics—Part B: Cybernetics, Apr. 2006, pp. 443-449, vol. 36, No. 2, IEEE.
Valstar et al., "Combined Support Vector Machines and Hidden Markov Models for Modeling Facial Action Temporal Dynamics," 2007, pp. 118-127, Department of Computing, Imperial College London, England, Springer-Verlag Berlin Heidelberg.
Chang et al., "Manifold Based Analysis of Facial Expression," Image and Vision Computing, 2006, pp. 605-314, vol. 24, Elsevier B.V.
Essa et al., "Coding, Analysis, Interpretation, and Recognition of Facial Expressions," Short Papers, IEEE Transactions on Pattern Analysis and Machine Intelligence, Jul. 1997, pp. 757-763, vol. 19, No. 7, IEEE.
Wang et al., "Expression Recognition from Time-Sequential Facial Images by use of Expression Change Model," 1998, pp. 324-329, Department of Systems and Human Science, Graduate School of Engineering Science Osaka University, Osaka, Japan, IEEE.
Yacoob et al., "Recognizing Human Facial Expressions from Long Image Sequences using Optical Flow," IEEE Transactions on Pattern Analysis and Machine Intelligence, Jun. 1996, pp. 636-642, vol. 18, No. 6, IEEE.
Ojansivu et al., "Blur Insensitive Texture Classification using Local Phase Quantization," 2008, pp. 236-243, Machine Vision Group, Department of Electrical and Information Engineering, University of Oulu, Finland, Springer-Verlag Berlin Heidelberg.
Littlewort et al., "Dynamics of Facial Expression Extracted Automatically from Video," Image and Vision Computing, 2006, pp. 615-625, vol. 24, Elsevier B.V.
Ojala et al., "Multiresolution Gray-Scale and Rotation Invariant Texture Classification with Local Binary Patterns," IEEE Transactions on Pattern Analysis and Machine Intelligence, Jul. 2002, pp. 971-986, vol. 24, No. 7, IEEE.
Donato et al., "Classifying Facial Actions," IEEE Transactions on Pattern Analysis and Machine Intelligence, Oct. 1999, pp. 974-989, vol. 21, No. 10, IEEE.
Lucey et al., "AAM Derived Face Representations for Robust Facial Action Recognition," Proceedings of the 7th International Conference on Automatic Face and Gesture Recognition (FGR'06), 2006, pp. 1-6, IEEE Computer Society.
Saragih et al., "Face Alignment through Subspace Constrained Mean-Shifts," 2009 IEEE 12th International Conference on Computer Vision (ICCV), 2009, pp. 1034-1041, IEEE.
Matthews, et al., "Active Appearance Models Revisited," International Journal of Computer Vision, 2004, pp. 135-164, vol. 60, No. 2, Kluwer Academic Publishers, The Netherlands.
Boker, et al., "Effects of Damping Head Movement and Facial Expression in Dyadic Conversation using Real-Time Facial Expression Tracking and Synthesized Avatars," Philosophical Transactions of the Royal Society B, 2009, pp. 3485-3495, vol. 364.
Cootes et al., "Active Appearance Models," IEEE Transactions on Pattern Analysis and Machine Intelligence, Jun. 2001, pp. 681-685, vol. 23, No. 6, IEEE.
Kanade et al., "Comprehensive Database for Facial Expression Analysis," pp. 1-8, Carnegie Mellon University, Pittsburgh, PA, USA.
Pantic et al., "Web-Based Database for Facial Expression Analysis," 2005, pp. 1-5, Delft University of Technology EEMCS / Man-Machine Interaction Group, Delft, The Netherlands, IEEE.
Pantic et al., "Facial Action Recognition for Facial Expression Analysis from Static Face Images," IEEE Transactions on Systems, Man and Cybernetics—Part B: Cybernetics, Jun. 2004, pp. 1449-1461, vol. 34, No. 3, IEEE.
Kaliouby et al.,"Mind Reading Machines: Automated Inference of Cognitive Mental States from Video," 2004 IEEE International Conference on Systems, Man and Cybernetics, 2004, pp. 682-688, IEEE.
Littlewort et al., The Computer Expression Recognition Toolbox (CERT), pp. 298-305.
Ambadar et al., "Deciphering the Enigmatic Face: The Importance of Facial Dynamics in Interpreting Subtle Facial Expressions," Psychological Science, 2005, pp. 403-410, vol. 16, No. 5, American Psychological Society.
Tong et al., "A Unified Probabilistic Framework for Spontaneous Facial Action Modeling and Understanding," IEEE Transactions on Pattern Analysis and Machine Intelligence, Feb. 2010, pp. 258-273, vol. 32, No. 2, IEEE computer Society.
Yang et al., "Boosting Coded Dynamic Features for Facial Action Units and Facial Expression Recognition," pp. 1-6.
Wu et al., "Facial Expression Recognition using Gabor Motion Energy Filters," pp. 42-47, IEEE.
Zhao et al., "Dynamic Texture Recognition using Local Binary Patterns with an Application to Facial Expressions," IEEE Transactions on Pattern Analysis and Machine Intelligence, Jun. 2007, pp. 915-928, vol. 29, No. 6, IEEE Computer Society.
Pantic et al., Automatic Analysis of Facial Expressions: The State of the Art, IEEE Transactions on Pattern Analysis and Machine Intelligence, Dec. 2000, pp. 1424-1445, vol. 22, No. 12, IEEE.
Yu et al., "Evolutionary Feature Synthesis for Facial Expression Recognition," Pattern Recognition Letters, 2006, pp. 1289-1298, vol. 27, Elsevier B.V.
Russell et al., "The Psychology of Facial Expression," pp. 1-17, Cambridge University Press, United Kingdom.

\* cited by examiner

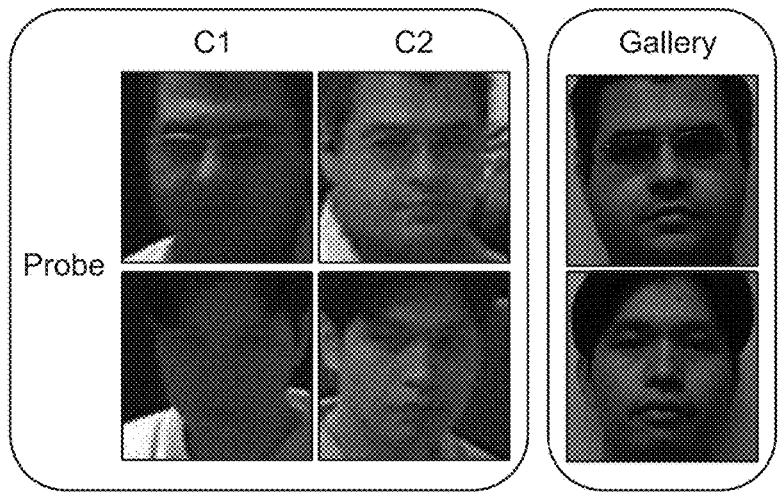
FIG. 13
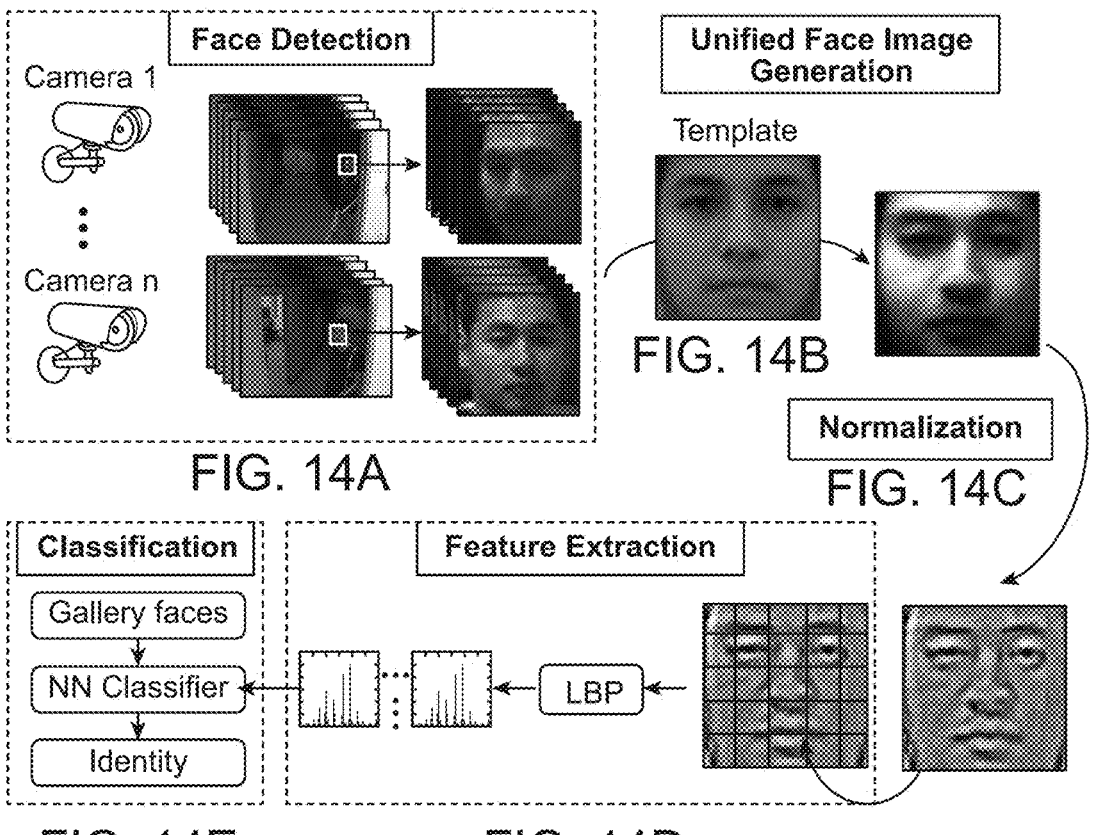
FIG. 14A
FIG. 14B
FIG. 14C
FIG. 14D
FIG. 14E

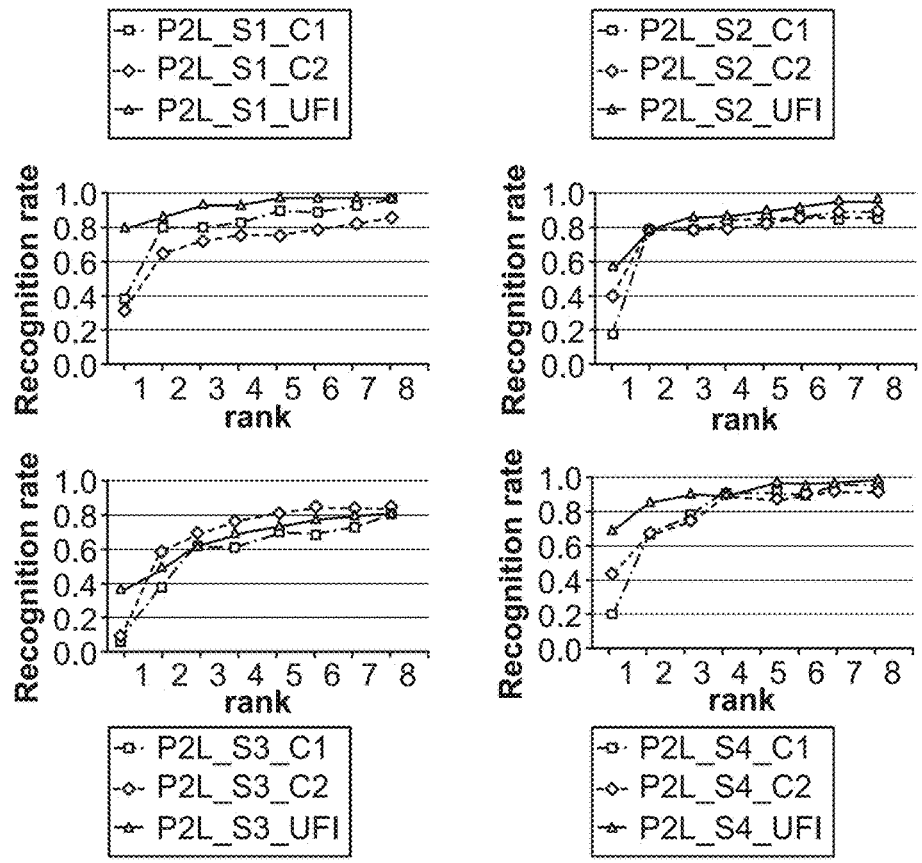
FIG. 23
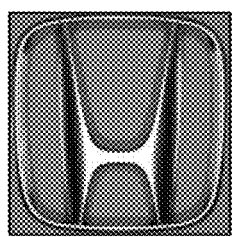 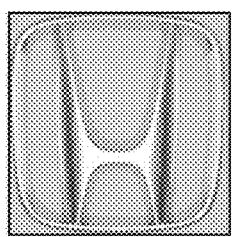 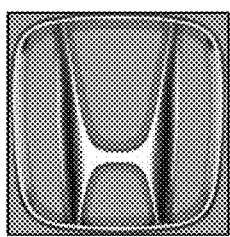 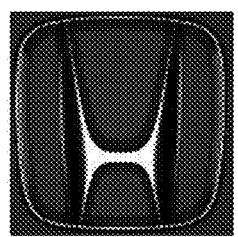
FIG. 24A   FIG. 24B   FIG. 24C   FIG. 24D

| Authors | Registration | Feature | Dynamic feature | Classifier | Dataset |
|---|---|---|---|---|---|
| Yacoob and Davis [26] | not mentioned | geometry: region-based optical flow | yes | rule-based classifier | posed data: 32 subjects |
| Essa and Pentland [27] | 3D model fitting | geometry: 3D motion and muscle models | yes | Euclidean norm | posed data: number of subjects not specified |
| Wang et al. [28] | not mentioned | geometry: B-spline curve | yes | Euclidean norm | posed data: 8 subjects |
| Hu et al. [29] | not mentioned | geometry: variation of active shape model | yes | probabilistic model | posed data: subject number not mentioned |
| Valstar et al. [30] | affine transform | geometry: dynamics of 20 facial points | yes | probabilistic actively learned Support Vector Machine (SVM) | MMI [13] and CK [14] |
| Pantic et al. [31] | affine transform | geometry: dynamics of 15 facial profile points | yes | rule-based | MMI [13] |
| Donato et al. [21] | in-plane image transform | appearance: Gabor wavelets | no | nearest neighbor | posed data: 24 subjects |
| Zhao and Pietikäinen [4] | in-plane image transform | appearance: LBP on three orthogonal planes (LBP-TOP) | yes | SVM | CK [14] |
| Bartlett et al. [32] | in-plane image transform | appearance: Gabor wavelets | no | SVM and Adaboost | CK [14] + posed data: 24 subjects |
| Wu et al. [5] | in-plane image transform | appearance: Gabor motion energy | yes | SVM | CK [14] |
| Tian et al. [33] | in-plane image transform | hybrid: geometric + transient facial features | no | Neural network | CK [14] + posed data |
| Lucey et al. [19] | Active Appearance Model (AAM) | hybrid: 2D shape + 2D appearance + 3D shape | no | nearest neighbor or SVM | acted data: Rutgers University2 (RU), 20 subjects |
| Zhou et al. [34] | AAM | hybrid: geometry + SIFT [35] | yes | multidimensional assignment algorithm | CK [14] + RU (20 subjects) |

FIG. 25

| Paper ID | Registration | Feature | Dynamic feature | Classifier |
|---|---|---|---|---|
| UCR: EAI [37] | SIFT flow [25] | appearance: LQP [22] or LBP [24] | no | SVM |
| UIUC-UMC [38] | affine transformation | appearance: SIFT + hierarchical Gaussianization + motion | no | SVM |
| KIT [39] | in-plane image transformation | appearance: discrete cosine transform (DCT) | no | SVM |
| UCSD-CERT [40] | affine transformation | appearance: Gabor wavelets | no | SVM |
| ANU [41] | constrained local model | appearance: pyramid of histogram of gradients + LPQ | no | SVM |
| UCL [42] | in-plane image transformation | appearance: edge orientation histogram of motion history histogram + motion change frequency of LBP | yes | SVM_2K [43] |
| UMont. [44] | in-plane image transformation | appearance: histograms of oriented gradients | yes | SVM |
| NUS [45] | in-plane image transformation | hybrid: accumulated motion image | no | SVM |
| QUT [46] | constrained local model | appearance: pixel based feature + LBP | no | SVM |
| Baseline [47] | in-plane image transformation | appearance: LBP | no | SVM |
| MIT-Cambridge [48] | not mentioned | hybrid: geometry + Gabor wavelets | no | Hidden Markov Model + Dynamic Bayesian Network |

| | | truth | | | | |
|---|---|---|---|---|---|---|
| | | Anger | Fear | Joy | Relief | Sadness |
| prediction | Anger | 12 | 3 | 0 | 0 | 1 |
| | Fear | 0 | 7 | 0 | 0 | 0 |
| | Joy | 0 | 5 | 19 | 4 | 0 |
| | Relief | 1 | 0 | 1 | 11 | 2 |
| | Sadness | 1 | 0 | 0 | 1 | 12 |
| total rate | | 0.86 | 0.47 | 0.95 | 0.69 | 0.8 |
| average rate | | 0.75 | | | | |

FIG. 28

| | | truth | | | | |
|---|---|---|---|---|---|---|
| | | Anger | Fear | Joy | Relief | Sadness |
| prediction | Anger | 13 | 0 | 0 | 0 | 0 |
| | Fear | 0 | 10 | 0 | 0 | 0 |
| | Joy | 0 | 0 | 10 | 0 | 0 |
| | Relief | 0 | 0 | 1 | 10 | 0 |
| | Sadness | 0 | 1 | 1 | 0 | 9 |
| total rate | | 0.92 | 0.91 | | | 1 |
| average rate | | 0.96 | | | | |

FIG. 29

| | | truth | | | | |
|---|---|---|---|---|---|---|
| | | Anger | Fear | Joy | Relief | Sadness |
| prediction | Anger | 25 | 3 | 0 | 0 | 2 |
| | Fear | 0 | 17 | 0 | 0 | 0 |
| | Joy | 0 | 5 | 29 | 4 | 0 |
| | Relief | 1 | 0 | 2 | 21 | 2 |
| | Sadness | 1 | 0 | 0 | 0 | 21 |
| total rate | | 0.93 | 0.68 | 0.94 | 0.81 | 0.84 |
| average rate | | 0.84 | | | | |

FIG. 30

| | | truth | | | | |
|---|---|---|---|---|---|---|
| | | Anger | Fear | Joy | Relief | Sadness |
| prediction | Anger | 12 | 4 | 4 | 0 | 5 |
| | Fear | 0 | 8 | 0 | 0 | 0 |
| | Joy | 1 | 3 | 16 | 0 | 0 |
| | Relief | 1 | 0 | 0 | 14 | 1 |
| | Sadness | 0 | 0 | 0 | 2 | 7 |
| total rate | | 0.86 | 0.53 | 0.8 | 0.88 | 0.47 |
| average rate | | 0.71 | | | | |

FIG. 31

| | | truth | | | | |
|---|---|---|---|---|---|---|
| | | Anger | Fear | Joy | Relief | Sadness |
| prediction | Anger | 11 | 0 | 1 | 0 | 0 |
| | Fear | 0 | 9 | 1 | 0 | 0 |
| | Joy | 2 | 1 | 8 | 0 | 0 |
| | Relief | 0 | 0 | 1 | 10 | 1 |
| | Sadness | 0 | 0 | 0 | 0 | 9 |
| total rate | | 0.85 | 0.9 | 0.73 | 1 | 0.9 |
| average rate | | 0.87 | | | | |

FIG. 32

| | | truth | | | | |
|---|---|---|---|---|---|---|
| | | Anger | Fear | Joy | Relief | Sadness |
| prediction | Anger | 23 | 4 | 5 | 0 | 6 |
| | Fear | 0 | 17 | 1 | 0 | 1 |
| | Joy | 3 | 4 | 24 | 0 | 0 |
| | Relief | 1 | 0 | 1 | 24 | 2 |
| | Sadness | 0 | 0 | 1 | 2 | 16 |
| total rate | | 0.85 | 0.68 | 0.77 | 0.92 | 0.64 |
| average rate | | 0.77 | | | | |

|  |  | truth | | | | | | |
|---|---|---|---|---|---|---|---|---|
|  |  | An | Co | Di | Fe | Ha | Sa | Su |
| prediction | An | 81.8 | 11.1 | 3.6 | 4.0 | 0.0 | 29.6 | 0.0 |
|  | Co | 2.3 | 55.6 | 0.0 | 0.0 | 0.0 | 0.0 | 1.2 |
|  | Di | 6.8 | 0.0 | 85.7 | 4.0 | 1.6 | 11.1 | 0.0 |
|  | Fe | 0.0 | 5.6 | 1.8 | 40.0 | 0.0 | 0.0 | 0.0 |
|  | Ha | 0.0 | 0.0 | 3.6 | 32.0 | 98.4 | 0.0 | 0.0 |
|  | Sa | 2.3 | 5.6 | 1.8 | 0.0 | 0.0 | 48.1 | 0.0 |
|  | Su | 6.8 | 22.2 | 3.6 | 20.0 | 0.0 | 11.1 | 98.8 |
| average rate | | 82.6 | | | | | | |

FIG. 33

| | P1E_S1 | P1E_S2 | P1E_S3 | P1E_S4 | P1L_S1 | P1L_S2 | P1L_S3 | P1L_S4 | Average |
|---|---|---|---|---|---|---|---|---|---|
| C1 | 12% | 16% | 12% | 16% | 32% | 44% | 36% | 44% | 26.5% |
| C2 | 8% | 12% | 12% | 16% | 32% | 12% | 32% | 28% | 19% |
| UFI | 44% | 48% | 32% | 40% | 40% | 40% | 48% | 56% | 43.5% |

FIG. 34

| | P2L_S1 | P2L_S2 | P2L_S3 | P2L_S4 | Average |
|---|---|---|---|---|---|
| C1 | 37.93% | 17.24% | 6.9% | 20.69% | 20.69% |
| C2 | 31.03% | 41.38% | 10.34% | 44.83% | 31.90% |
| UFI | 79.31% | 55.17% | 37.93% | 68.97% | 60.35% |

FIG. 35

| Method | bicubic | KR | ICBI | ASDS | Proposed |
|--------|---------|-------|-------|--------|----------|
| DM | 28.96 | 31.40 | 30.46 | 31.44 | 37.27 |
| ANIS | 0.47 | 0.57 | 0.52 | 0.56 | 7.886 |
| CPBD | 15.22 | 22.86 | 11.80 | 116.88 | 337.74 |

FIG. 36

| Method | LR | bicubic | KR | ICBI | ASDS | Proposed |
|--------|-------|---------|-------|-------|-------|----------|
| HOG+1-NN | 53.33 | 72 | 77.33 | 76 | 64 | 100 |
| PCA+1-NN | 49.33 | 48 | 49.33 | 53.33 | 50.67 | 80 |
| PCA+15-NN | 50.67 | 52 | 54.67 | 57.33 | 56 | 90.67 |
| PCA+SVM | 30.67 | 30.67 | 34.67 | 33.33 | 36 | 100 |

FIG. 37

| Size to LR | Honda | Toyota | Nissan | Ford | Chevy | Overall% |
|------------|-------|--------|--------|------|-------|----------|
| 0.75 | 15 | 13 | 13 | 5 | 15 | 81.33 |
| 0.5 | 15 | 11 | 13 | 0 | 13 | 69.33 |
| 0.25 | 13 | 1 | 7 | 0 | 14 | 46.67 |

FIG. 38

UNIFIED FACE REPRESENTATION FOR INDIVIDUAL RECOGNITION IN SURVEILLANCE VIDEOS AND VEHICLE LOGO SUPER-RESOLUTION SYSTEM

CROSS REFERENCE TO RELATED APPLICATION

This application claims priority under 35 U.S.C. § 119(e) to U.S. provisional Application No. 61/708,579, filed on Oct. 1, 2012, and U.S. provisional Application No. 61/708,589, filed on Oct. 1, 2012, the entire contents of which are incorporated herein by reference in their entireties.

STATEMENT OF GOVERNMENT INTEREST

This invention was made with Government support under Grant No. 0905671 awarded by the National Science Foundation. The Government has certain rights in this invention.

FIELD

The difficulties in video based face recognition is mainly due to the uncontrolled poses and lighting conditions while the gallery data to be matched are often frontal shot images. The Unified Face Image is extracted from multiple video frames from single or multiple cameras by aligning these frames towards a common frontal view template. In such a way, the recognition performance is boosted with reduced discrepancy between the probe video data and the gallery image data. This disclosure also relates to a software system for super-resolving the vehicle maker's logos, and wherein the super-resolution of logos facilitates recognition of a vehicle make more reliably than low-resolution vehicle logos.

BACKGROUND

Facial expression plays a significant role in human communication. It is considered the single most important cue in the psychology of emotion. Automatic recognition of emotion from images of human facial expression has been an interesting and challenging problem for the past 30 years. Aiming toward the applications of human behavior analysis, human-human interaction, and human-computer interaction, this topic has recently drawn even more attention.

A literature review shows that early-stage research on facial expression recognition focused on static images. Both feature-based and template-based approaches were investigated. Recently, researchers have been using image sequences or video data in order to develop automated expression recognition systems. As demonstrated in the fields of computer vision and psychology, various types of dynamic information, such as dynamic appearance and dynamic geometry, can be crucial for the recognition of human expressions.

However, extracting the facial dynamics from an expression sequence is not a trivial problem. For example, there can be two critical questions: first is how to aggregate the dynamic information from expressions or varying lengths and to create features with fixed length, and second is how to perform alignment since capturing the dynamics requires near perfect alignment for the head pose and facial features. The inherent challenge for facial expression recognition is the dilemma between compensating the rigid motion or the head pose and extracting the nonrigid motion of facial muscles. For example, most existing algorithms and real-time computer programs are only capable of analyzing a frontal face with a near upright angle. This is not due to the failure to detect a face but due to the failure to register the detected face reasonably in a video.

In addition, recognition of the make and model of vehicles has generated interest in recent years. However, the majority of the work has been focused on appearance based methods. Vehicle logos provide an alternate approach for the recognition. However, the resolution of surveillance videos is insufficient for direct recognition of logos. This disclosure proposes a super-resolution approach for vehicle logos to improve the recognition rate.

Super-resolution (SR) algorithms produce high-resolution (HR) image from low-resolution (LR) input. Accurate SR reconstruction is usually difficult and is an ill-posed image processing problem. The existing SR algorithms can be roughly categorized into two classes based on the types of input.

The SR methods in the first class take multiple images as input. Usually, registration is performed first to align the input images. Super-resolution or interpolation is carried out subsequently to fuse multiple aligned LR images to get a HR output. These methods are based on the assumption that the LR inputs can be generated by warping and downsampling the super-resolved image. However, when the magnification increases, this assumption becomes weaker.

The SR methods in the second class use single LR image as input to infer the HR output. With the general idea that the relationship between the HR images and the LR images can be learned from examples, many methods in this class require a training step. Glasner et al. avoided using a set of training images by exploring the rich patterns in a single image. Besides, advanced interpolation algorithms without training have also been proposed which outperform the conventional interpolation techniques. For highly structural images such as vehicle logos, it is natural to develop a learning based SR approach where the model is trained from a set of similar images. Inspired by the recent success in super-resolving face images, which are also highly structural using manifold learning techniques, it would be desirable to establish a method in the subspaces that cater to the specific application for vehicle logo super-resolution. For example, one assumption is that the HR and LR manifolds have similar structure which is locally linear and smooth. In accordance with an exemplary embodiment, canonical correlation analysis (CCA) can be applied upon the PCA coefficients of HR and LR logo images to enhance the coherence of their neighborhood structure.

SUMMARY

In accordance with an exemplary embodiment, a method for unified face representation for individual recognition in surveillance videos, comprising: extracting a face from a video; generating an emotion avatar image (EAI) representation of the face from the video; computing features from the EAI using both local binary patterns and local phase quantization; and classifying the features as one of an emotion type by using a linear support vector machine classifier.

In accordance with an exemplary embodiment, a method of recognizing a vehicle, comprises: obtaining a limited number of high resolution logos; populating a training dataset for each of the limited number of high resolution logos using gamma transformations; obtaining a low resolution image of a vehicle; and matching the low resolution image of the vehicle with the training dataset.

In accordance with another exemplary embodiment, a computer program product comprising a non-transitory computer usable medium having computer readable code embodied therein for recognizing a logo on a vehicle, which includes the steps of: obtaining a limited number of high resolution logos; populating a training dataset for each of the limited number of high resolution logos using gamma transformations; obtaining a low resolution image of a vehicle; and matching the low resolution image of the vehicle with the training dataset.

DESCRIPTION OF DRAWINGS

FIGS. 2A and 2B show a sample sequence for posed data, wherein very little head motion is involved, and wherein FIG. 2A is a CK data set, and FIG. 2B is a MMI data set.

FIG. 13 shows sample data from the ChokePoint dataset, and the subject's faces were captured by multiple cameras, and the appearance between the probe data and the gallery data is considerably different.

FIGS. 14A, 14B, 14C, 14D, and 14E show a system overview, and after the faces are extracted from the video sequence, and the UFIs are generated, and the lighting effects is normalized between the features extraction and classification.

FIG. 23 shows the cumulative match curves for the testing sequences in portal 2, when the subjects are leaving the portal (P2L).

FIGS. 24A, 24B, 24C, and 24D illustrate original log image (FIG. 24A), and generated logo images by gamma adjustment (FIGS. 24B-24D).

FIG. 25 is a table, which shows a comparison of selected facial expression recognition techniques, which includes registration techniques, feature types, dynamic features, classifiers, and data sets.

FIG. 26 is a table, which shows a comparison of methods by proposed different teams whose papers were accepted in the FERA Challenge, which includes a listing of methods and their corresponding registration techniques, features including dynamic features, and classifiers.

FIG. 27 is a table, which shows a confusion matrix for EAI+LPQ (Person Independent) in accordance with an exemplary embodiment.

FIG. 28 is a table, which shows a confusion matrix FI for EAI+LPQ (Person Specific) in accordance with an exemplary embodiment.

FIG. 29 is a table, which shows a confusion matrix for EAI+LPQ (Overall) in accordance with an exemplary embodiment.

FIG. 30 is a table, which shows a confusion matrix for EAI+LBP (Person Independent) in accordance with an exemplary embodiment.

FIG. 31 is a table, which shows a confusion matrix for EAI+LBP (Person Specific) in accordance with an exemplary embodiment.

FIG. 32 is a table, which shows a confusion matrix for EAI+LBP (Overall) in accordance with an exemplary embodiment.

FIG. 33 is a table, which shows a confusion matrix for the CK+Data Set (An=Anger, Co=Contempt, Di=Disgust, Fe=Fear, Ha=Happy, Sa=Sadness, Su=Surprise).

FIG. 34 is a table, which shows recognition rates for the testing sequence in portal 1 in accordance with an exemplary embodiment.

FIG. 35 is a table, which shows recognition rates for the testing sequence in portal 2 in accordance with an exemplary embodiment.

FIG. 36 is a table, which shows average metric scores by DM, ANIS, and CPBD for all logo images in accordance with an exemplary embodiment.

FIG. 37 is a table, which shows average logo recognition accuracies in percentage in accordance with an exemplary embodiment.

FIG. 38 is a table, which shows the number of logos recognized correctly (out of 15) with downsampled LR images using a HOG+1-NN classifier.

DETAILED DESCRIPTION

Figure 1:
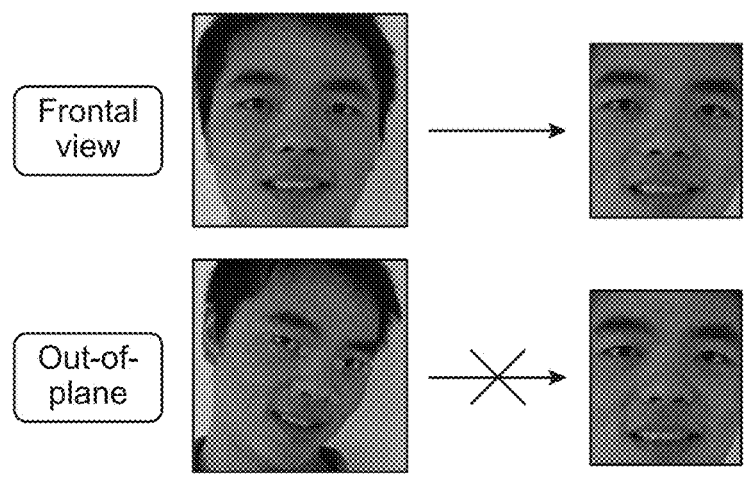
FIG. 1 shows existing face registration techniques cannot handle out-of-plane head rotation.

As shown in FIG. 1, when a subject's face is in frontal view, near frontal view, or has in-plane rotation, the alignment can be done easily by in-plane image transformation. For example, one can detect both eye locations, scale the distance of both eyes to a constant value for every subject, and then rotate the image to guarantee that both eyes are horizontally aligned. Finally, one can translate the entire image such that the eyes are located at some predefined locations. This registration technique can be suitable for some early-stage research experiments where facial expression data are acquired under controlled conditions. For example, one restriction is that in the collected data, not much head movement should be involved. To accomplish this, data are collected by cameras mounted on the subject's head to eliminate the head motion.

Figure 2A:
Figure 2B:

Three types of data can be used in the facial expression recognition community, namely posed data, acted data, and spontaneous data. For data sets that are collected from a stationary camera can includes the web-based database for facial expression analysis (MMI) data set and the Cohn-Kanade (CK) data set. (See FIGS. 2A and 2B). As shown in FIGS. 2A and 2B, the subjects show facial expressions with minimum head movement and therefore help researchers to focus on the nonrigid facial muscle movement. Thus, these data sets fall into the category of posed facial expressions, meaning that the subjects are given "instructions" before showing expressions. Subjects are conscious about controlling their facial muscle movement. All the expressions start from a neutral face, which provides a good reference for computing the nonrigid facial motion. However, experiments demonstrate that, in human-human interaction such as conversation. People tend to adapt their head movements and facial expressions in response to the stimulus, which is strong evidence of the fact that facial expression is correlated with head motion. This fact is also true in a more realistic data set such as the GEMEP-FERA challenge data set. Therefore, registration techniques should take care of out-of-plane head rotation for realistic data.

One technique that state-of-the-art algorithms use is 2-D affine transformation. A number of facial "anchor points" are defined whose motion is relatively stable during facial expressions. Such anchor points include eye locations, inner and outer eye corners, and the tip of the nose. For example, one could also define a corresponding target location for each anchor point. Once, the anchor points are detected, the affine transformation matrix could he computed by minimizing the sum or the least square error of detected location and target location of the anchor points. This affine transform is subsequently applied to the entire face image to complete the registration step.

The affine-based registration performs quite well when in plane or minor out-of-plane head motion is present. However, the anchor points are not entirely stable during a facial expression. The eye corner could be unstable if the subject is blinking or the tip of the nose could also be moving and so forth. The typical number of anchor point is around six. If not all points are detected correctly, a large transformation error will be generated, and the affine transformation of the original image will be unacceptable. Moreover, affine-based registration is not temporally smooth. If a minor change occurred to an anchor point for two consecutive face images, the affine transform matrix will be off by a small amount. After applying this affine transform to the entire face image, every single pixel is affected due to this minor change. This will result in a fake motion for the stationary face regions. Therefore, the entire dynamic analysis based on this registration method will be imprecise.

Another registration technique is through the active appearance model (AAM). The automatic AAM fitting process may perform poorly for person-independent cases. Thus, it may require manual labeling of a subset of the frames for each data to improve the fitting result, which is understandable in an automated system. Recently, a person-independent AAM approach has been developed; however, this technique can be inaccurate due to false feature localization.

A significant issue in addition to face registration is the person-independent property (subjects in the test data are not used for training) of the algorithm. Computer algorithms cannot be trained with data for all human beings. The generalization ability must allow the system to predict for the unseen people. Thus, the computer algorithms can be expected to extract person-invariant features. This property enables the system to carry out facial expression recognition from a person-dependent (or person-specific) environment to a person-independent environment.

The person-specific information, including facial geometry and facial appearance, can be eliminated at two steps in a system: face registration and feature extraction. In-plane image transformation-based registration techniques do not change the geometry or appearance of facial features; therefore, the person specific information is retained. An AAM-based approach can warp the facial appearance and align the landmark points. The affine-transformation-based registration algorithms are able to change the geometry and the appearance of a person to a limited extent. When a face is in a near frontal view (where the affine-based registration accomplishes the most plausible result) and only a simple transformation is needed, the face geometry is mostly unaltered. When faces are not in the frontal view (contain out-of-plane head rotation), the affine-based algorithm is able to change the face geometry by a large amount, but unfortunately, that is when this approach can perform relatively poorly and when most of the registration results are unacceptable.

The person-specific information can be also eliminated through feature extraction. Features that are extracted could be categorized into geometry based and appearance based. Geometry-based approaches track the geometry of landmark points over time and use their geometric relations or dynamics as the feature. If the locations of the facial landmark points are normalized and only the amount of location change is considered to be the feature, it falls into the category of a person-independent feature. For example, the emotion "joy" is typically accompanied with a smile, which results in the mouth expanding and the lip corner being pulled up. However, the geometry-based inference is sensitive to out-of-plane head rotation. This rigid head motion may disguise the true motion of the landmark points; therefore, it generates a large error in the extracted feature. On the other hand, the appearance based approaches, such as local binary patterns (LBPs), Gabor wavelets, and local phase quantization (LPQ), concentrate on the dense response of filters to the intensity values of a face. These methods are inherently person dependent unless person-dependent information is eliminated during the face registration process.

The challenges aforementioned encourage the development of a system that accurately registers face images even with out-of-plane rotation and, at the same time, eliminates the person-specific information. To pinpoint the key emotion or an image sequence while circumventing the complex and noisy dynamics, one can also seek to summarize the emotion video containing a sequence of frames. If a single good image representation based upon which one can make judgments is found, one would be able to infer the emotion expressed through a sequence of facial expressions in a computationally efficient manner.

In accordance with an embodiment, the SIFT flow algorithm can be used to register the facial images. By matching the dense SIFT descriptors across image pairs; this method is able to generate satisfactory alignment results for facial features. Although the SIFT flow is originally designed for image alignment at the scene level, it is reasonable to apply it here to facial expression recognition since a human face can be considered as a scene in this case. In accordance with an embodiment, SIFT is capable of globally aligning the head/face region while maintaining the shape and motion of facial features for consecutive frames. In order to solely extract the facial motion information irrespective of person-specific information, a single "avatar reference" face model is iteratively build, onto which all the face images are aligned. Later, the avatar reference face model can be updated, which is also the single good representation, for example, the emotion avatar image (EAI) for each video consisting of frames for an emotion. The model name is "avatar" because the subjects are morphed toward homogeneity, whereas the emotions are successfully retained. Subsequently, the EAIs are individually passed through LBP and LPQ texture descriptors for feature extraction. Finally, support vector machines (SVMs) with a linear kernel are used for classification. In accordance with an embodiment, the approach transforms the expression recognition problem from an image sequence back to a single image.

In accordance with an embodiment, the related work, motivation, and the contribution of the disclosure are disclosed in Section II. Subsequently, the effectiveness of the data for facial expression and our iterative algorithm to build the avatar reference and EAIs are disclosed in Section III. Two combinations of methods are tested, and the classification results of different techniques are compared in Section IV. The conclusions of this disclosure are provided in Section V.

A large amount of effort has been focused on describing facial expression features. Based on the feature in use, as introduced earlier, the methods can be divided into three categories, e.g., geometry-based approaches, appearance based approaches, and the combination of the two. Geometry based approaches track the facial geometry information based on a set of facial landmark points over time and classify expressions based on their deformation. Alternatively, appearance-based approaches use information from the facial texture described by various types of texture descriptors, such as LBP, Gabor wavelets, and LPQ. The dynamics of the texture deformation can also be included for feature extraction. In FIG. 25, a comparison of methods from the literature based on the usage of registration techniques, feature types, dynamic features, classifiers, and the data set is provided.

In this disclosure, the methods that are compared with the proposed method are listed in FIG. 26. In FIG. 26, their registration techniques, features, and classifiers are analyzed. In addition, the features and classifiers that are adopted are disclosed. Later, in Section IV, a comparison of the methods on the same data, which is the GEMEP-FERA challenge data set, is disclosed.

Based on how the data are acquired, it can be categorized into three classes: posed data, acted data, and spontaneous data. When posed data are collected, subjects are given a series of "instructions" such as emphasize on the facial muscle movement and try not to move the head. Posed data played-an important role in the early-stage research, because it provided researchers with more insights about the relation of expression to the muscle movement. The CK database and the MMI database fall into this category. The ultimate goal of the research community is to recognize spontaneous facial expressions. However, spontaneous data are very hard to acquire. Facial expressions can be called spontaneous when subjects are not aware that they are being recorded, and naturally express emotions. Since it is very difficult to design a fully unaware environment when collecting data, no spontaneous data set coded with explicit emotions is publicly available.

Figure 3:
FIG. 3 shows uncontrolled acted data from the Geneva Multimodal Emotion Portrayal-Facial Expression and Analysis Challenge (GEMEP-FERA) data set.
Figures 4A, 4B:
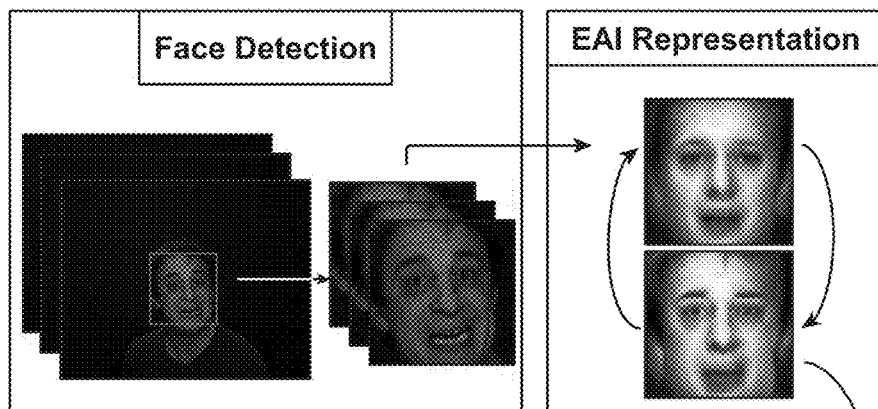
FIGS. 4A, 4B, 4C, and 4D show an overview of the approach in accordance with an embodiment.
Figures 4C, 4D:
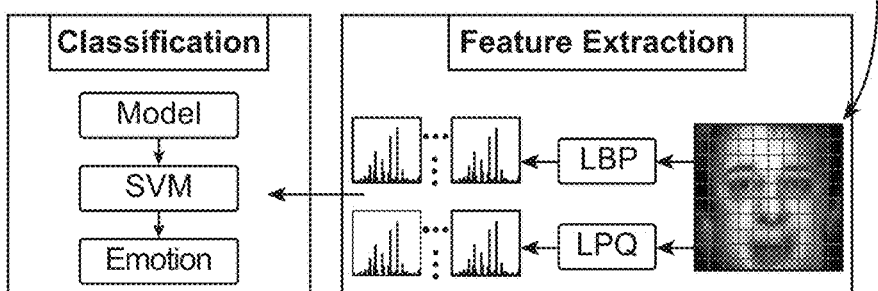

The intermediate stage between the previous two, namely, the acted data, has less control than the posed data, but subjects are fully aware when data are being recorded. The GEMEP-FERA challenge data set that this disclosure used belongs to this class and is shown in FIG. 3. In the process of data collection, subjects were not asked to control themselves but just to convey a certain emotion. These experiments have no control about the body pose, the head pose, the gesture, or occlusion and are therefore very challenging for expression recognition by an automated system.

To motivate the method, the specifications of the GEMEP-FERA data set were analyzed as follows: each video contains one subject displaying expressions corresponding to a certain emotion; ten subjects (five males and five females) are involved with their upper body visible; subject's age is approximately between 25 and 60 years, as judged by observation; video resolution is 720×576, and face resolution is around 200×200 pixels; average video length is about 2 seconds with a frame rate of 30 fps; each video contains one subject displaying expressions corresponding to a certain emotion; five emotions are involved: Anger, Fear, Joy, Relief, and Sadness, which is different from the typical six basic emotions data sets; there are three to five videos for each subject with the same emotion; most subjects are uttering meaningless phrases while displaying an expression; and videos do not start with the neutral face or end at the apex or the offset, which is unlike the CK and MMI data sets; multiple apexes are involved in some videos; and the neutral face is not always available.

The given observations provide us the following key facts that inspire the disclosed system include:

1) Good registration can be demanding, and previous registration techniques (in-plane image transformation and affine-based transformation) are not suitable for this data set;

2) Dynamical changes can be hard to recover because the neutral reference face is not always available; and.

3) Constant lip motion can limit the geometry-based approaches.

Existing work intensely emphasizes on analyzing the sequential change of the facial feature. Nevertheless, since the onset and the offset for realistic data are hard to detect, if a near-apex frame is able to be picked up to represent an entire expression session, one can avoid extracting subtle sequential facial feature deformations and describe emotions in a reliable manner.

The contributions of this disclosure are the following. First, iteratively build a reference face model called the avatar reference. This homogenous reference face model can capture the nature of the entire data set. Second, condense a video sequence in a single image representation, for example, an EAI, for facial expression recognition. The EAI representation can register the facial features at meaningful locations and maintains the nonrigid facial muscle movement. Third, the EAI representation can be capable of aggregating dynamic facial expression information with various lengths into fixed length features. Fourth, being able to suppress the person-specific information, the EAI representation also allows the expression recognition tasks to be carried out in a person-independent manner.

For example, until now, little work has been done to condense a video sequence into a tractable image representation for emotion recognition. As the results in Section IV show, the disclosed algorithm can distinguish most of the differences between expressions, as long as the expressions are not so subtle that even the human visual system is unable to detect them.

In FIGS. 4A-4D, the method and systems as disclosed herein is outlined in four major steps. After automatically extracting faces from raw video, insights about the EAI representation is disclosed that suppresses the person-specific information while maintaining the shape and texture information on the facial features. Both LBP and LPQ texture descriptors can be applied to generate the features. Then, the linear SVM classifiers can be used for classification. The model used for testing is trained with a 1-versus-1 SVM.

A. Face Detection

The face is first extracted from the video using the Viola and Jones face detector implemented in OpenCV. This algorithm achieves relatively high-quality performance and is suitable for real-time processing. The detection rate is near perfect on the GEMEP-FERA data set. Since the face resolution is around 200×200 pixels, the detected face image is resized exactly to this resolution using bicubic interpolation. This process removes the noise and smoothes the raw images.

B. EAI Representation

1) SIFT Flow Alignment: SIFT flow has been recently introduced in C Liu, J. Yue, and A Torralba, "SIFT Flow: Dense correspondence across scenes and it applications," IEEE Trans. Pattern Anal. Intell. Vol. 33, no. 5, pp. 978-994, May 2011 (hereinafter "SIFT Flow"). It is originally designed to align an image to its plausible nearest neighbor, which can have large variations. The SIFT flow algorithm robustly matches dense SIFT features between two images while maintaining spatial discontinuities.

In SIFT Flow, the local gradient descriptor SIFT can be used to extract a pixelwise feature component. For every pixel in an image, the neighborhood (e.g., 16×16) is divided into a 4×4 cell array. The orientation of each cell is quantized into eight bins, generating a 4×4×8 128 dimension vector as the SIFT representation for a pixel or the so-called SIFT image. The SIFT image has a high spatial resolution and can characterize the edge information.

After obtaining the per-pixel SIFT descriptors for two images, a dense correspondence is built to match the two images. Similar to optical flow, the objective energy function, an attempt to minimize the designed was used as follows:

$$E(w) = \Sigma_p \min(\|s_1(p) - s_2(p + w(p))\|(j \cdot t) \quad (1)$$
$$+ \Sigma_p n(|\mu(p)| + |\upsilon(p)|) \quad (2)$$
$$+ \Sigma_{(p,q) \in \varepsilon} \min(\alpha|\mu(p) - \mu(q)| \cdot d) + \min(\alpha|\upsilon(p) - \upsilon(q)|, d) \quad (3)$$

where p=(x, y) is the grid coordinates or the images and w(p)=((u(p),υ(p)) is the flow vector at p. u(p)·υ(p) is the flow vector for the x-direction and the y-direction, respectively. $S_1$ and $S_2$ are two SIFT images to be matched. ε contains all the spatial neighbors (a four-neighbor system is used). The data term in (1) is a SIFT descriptor match constraint that enforces the match along the flow vector w(p). The small displacement constraint in (2) allows the flow vector to be as small as possible when no other information is available. The smoothness constraint in (3) takes care of the similarity of flow vectors for adjacent pixels. In this objective function, the truncated L1 norm is used in both the data term and the smoothness term with t and d as the threshold of matching outliers and flow discontinuities, respectively. n and α are scale factors for the small displacement and the smoothness constraint, respectively.

The dual-layer loopy belief propagation is used as the base algorithm to optimize the objective function. Then, a coarse-to-fine SIFT flow matching scheme can be adopted to improve the speed and the matching result.

Figure 5A:
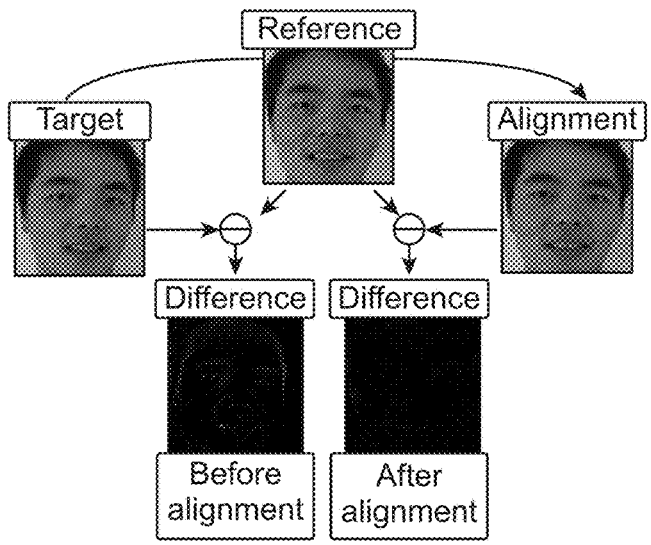
FIGS. 5A and 5B show SIFT (flow face recognition performs well when the pose change is small or large, and wherein it captures the facial muscle motion in both cases but the results are very noisy, and wherein (FIG. 5A) minor differences, only true facial motions are captured as shown by the corresponding difference image of before alignment and after alignment, (FIG. 5B) major difference (bottom right) difference image of the reference and the alignment results show the true facial motions are captured in the inner eye corner areas.

Two frames with a minor pose difference are shown in FIG. 5A. The target frame is aligned with respect to a reference frame. For comparison purpose, the absolute difference between images before alignment and after alignment with respect to the reference is separately taken. Comparing the two difference images in FIG. 5A, the rigid head motion from the minor pose change is eliminated. For example, the difference image also shows that the SIFT flow alignment process is noisy.

Figure 5B:
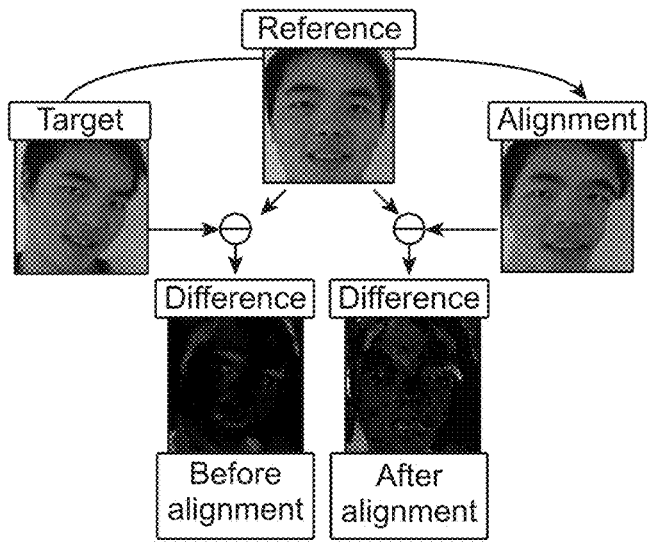

Consider a case with a major pose change in FIG. 5B, the head pose motion is out of plane, and the facial appearance significantly changes. The registration result is in the upright pose, and nonrigid motion in the mouth and eyes areas can still be captured. Differences at the periphery are due to the lack of correspondences for SIFT flow vectors. However, this information is still useful as it captures the pose change, which is also an important cue in facial expression recognition differences at the periphery show that the pose change and the true facial feature motion are separated. Similar to the minor pose change case, the noise and discontinuity can be issues in the aligned result.

2). Avatar Reference and the EAI SIFT flow have the potential to align images with large spatial variation. This is useful in aligning the face image given the possibility of a large head pose change or occlusion. However, the person specific information still has to be eliminated. In accordance with an embodiment, a reference face with respect to which each face image can be aligned is built.

---

Algorithm 1 Avatar Reference and EAI

---

Given:
$I^{(m,n)}$: face image from sequence m, frame n
M: total number of image sequences
$N_m$: total number of frames in sequence m
   Q: user-defined number of levels
$A_i^{ref}$ Avatar Reference at level-i
$EAI_i^m$: EAI representation for sequence m based on the level-i Avatar Reference $A_i^{ref}$
$I_{align}^{(m,n)}$: the alignment result for a face image $I^{(m,n)}$ using SIFT flow Initialization $A_0^{ref} = \dfrac{1}{\left(\sum_{m=1}^{M} N_m\right) \sum_{m=1}^{M} \sum_{n=1}^{N_m} I^{(m,n)}}$ for i = 1 → Q do
   for m = 1 → M do
      for n = 1 → $N_m$ do
         $I_{align}^{(m,n)}$ ← SIFT flow ($I^{(m,n)}, A_{i-1}^{ref}$)
      end for $$EAI_i^m \leftarrow \frac{1}{N_m} \sum_{n=J}^{N_m} I_{align}^{(m,n)}$$

end for $$A_i^{ref} \leftarrow \frac{1}{\sum_{m=1}^{M} \sum_{m=1}^{M} EAI_i^m}$$

end for

---

In Algorithm 1, an iterative averaging method to generate an avatar reference face model is disclosed. For example, the algorithm averages all possible face images in the training data set. Initially using this average face as the reference, each face image in the video using SIFT flow is aligned. After alignment, the user can update the avatar reference using all the aligned faces. The iteration number defines the level of the avatar reference (level 0 means the average of all the unaligned face images). The avatar reference models for the first three levels are shown in row 1 in FIG. 6. For example, the avatar reference is not always a neutral face. Rather, the avatar captures the most likely facial appearance throughout the whole data set; therefore, it has less total variation in registration. In an exemplary embodiment, the mouth is open for the level-1 and level-2 avatar reference face results (as shown in row 1 in FIG. 6). For example, this is because most of the subjects in the training data are uttering meaningless phrases and therefore have a lot of mouth movement.

In Algorithm 1, once the avatar reference face model is obtained, the single-representation EAI for the sequence of face images at the current level is established. As demonstrated earlier, a single-aligned face image possesses errors and discontinuities. Therefore, an image sequence as the average of all frames within this sequence is disclosed. The statistical justification of the EAT representation is similar to J. Han and B Bhanu, "Individual recognition using gait energy image", IEEE Trans. Pattern Anal. Mach Intell, vol. 28, no. 2, pp 316-322, February 2006. For example, the distribution of every aligned face frame is assumed to be subject to an addition of a true face and additive noise. The noise is further assumed to be Gaussian. During the averaging process, the noise variance is reduced by a factor of N, where N is the number of face images. Thus, the alignment noise can be removed from our EAI representation.

Figure 6:
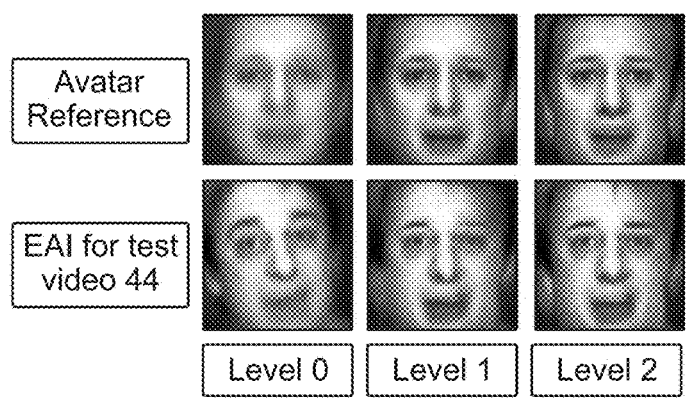
FIG. 6 shows an avatar reference face model and EAI representation for the first three levels, and for comparison, level-0, EAIs are the average of every face image from their corresponding videos without alignment, and higher levels of EAI have more facial features details and a homogenous face model.
Figure 7:
FIG. 7 shows a level-2 EAI representation for subjects in the CK+ data set, and wherein the facial features are reasonably aligned, and person-specific information is attenuated.

3) Characteristics of EAI:

In this disclosure, an attempt to test the performance of EAIs at different levels is disclosed. As shown in FIG. 6 (row 2), the quality of the EAIs improves as the level of avatar reference becomes higher. A high-level avatar reference model enhances the facial details, corrects the rigid head pose change, and attenuates the person-specific information. Meanwhile, EAI representation retains the expression information that is recognizable by the human visual system. The EAI representations for five subjects with different emotions are shown in FIG. 7 (due to publication permission issue, only sample EAI representations are shown for a subset of emotions in the CK+ data set). In S. Yang and B Bhanu, "Facial expressions recognition using emotion avatar image," in *Proc. IEEE Int. Conf. Autom. Face Gesture Recog. Workshop Facial Express. Recog. Workshop Human Comput. Interact.*, June 2011, pp. 1-6, similar figures for the Facial Expression Recognition and Analysis Challenge (FERA) challenge data set were obtained. Since all the faces are aligned with respect to the same avatar reference, the EAI representation can be seen to align facial features, such as the nose, eyes, and the mouth reasonably. This lays the foundation for extracting meaningful facial feature motion. In addition, aligning every face image with the avatar reference allows the elimination of the person specific information to a great extent.

The EAIs in FIG. 7 can also be observed to capture the nonrigid facial feature motion and the corresponding facial expression information. This is due to the small constraint intensity parameters n in equation (2). Larger values of n will penalize the large flow vectors more, which will result in less morphing for the alignment result. Ideally, if two face images are perfectly aligned, all the facial features should be at exactly the same locations. The facial feature motion will be eliminated in this case. In practice, the real facial feature motions during an expression are larger than the SIFT flow compensation and, subsequently, can be maintained in the noisy alignment results. The accumulation process will smooth the alignment results while capturing the real motion caused by a facial expression.

In accordance with an embodiment, EAI is used for the following reasons. First, it is a morphed version or incarnation of the original person. Its identity is altered through the change of facial geometry. Facial features for every person are warped to a common reference. Second, the representation maintains the original emotion conveyed through facial expression. Thus, an emotion avatar is a subset of an avatar. Third, it is an image representation and not a 3-D model. The avatar reference and EAI are related as described in Algorithm 1.

C. Feature Extraction

The EAI representation allows one to represent the recognition problem with a single image rather than a video. To test the effectiveness of our single-image-representation EAI, the facial texture from EAI using the well-known texture descriptor LBP and the recently proposed blur-insensitive LPQ descriptor are disclosed.

1) LBP: The LBP is a powerful and well-known texture descriptor. In this disclosure, the extended version of the basic LBP can be used where the LBP descriptor is uniform and grayscale invariant. To briefly go over this extended work, the operator, which is denoted as $LBP_{P,R}^{u2}$ is applied to a circularly symmetric neighborhood with P number of pixels on the circle of radius R. Superscript "u2" denotes the uniform property. A uniform LBP is favorable since it reduces the feature dimension. For example, the $LBP_{8,1}^{u2}$ adopted in this disclosure will generate 59 basic patterns, whereas the $LBP_{8,1}$ has 256 possibilities. Since these parameter settings are used in the baseline method, the same settings for better comparison were adopted.

After thresholding each pixel in its neighborhood with respect to the center value, the histogram is used to accumulate the occurrence of the various patterns over a region. In accordance with an embodiment, the face images are resized to 200×200, and each image is divided into blocks of size 20×20 blocks to capture the local texture pattern. Therefore, the LBP feature vector in use of dimension 59×10×10=5900. As mentioned earlier, the face resolution is close to 200×; hence, all face images were resized to this uniform value to minimize the information loss.

2) LPQ: The blur insensitive LPQ descriptor is originally proposed in [24]. The spatial blurring is represented as multiplication of the original image and a point spread function (PSF) in the frequency domain. The LPQ method is based upon the invariant property of the phase of the original image when the PSF is centrally symmetric.

The LPQ method examines a local M×N neighborhood $N_x$ at each pixel position x of image f(x) and extracts the phase information using the short-term Fourier transform defined by $$F(u,x) = \Sigma_{y \in N_x} f(x-y) e^{-j2\pi u^T y} = w_u^T f_x \quad (4)$$

where $w_u$ is the basis vector of the 2-D Discrete Fourier transform at frequency u, and $f_x$ is another vector containing all $M^2$ image samples from $N_x$.

The local Fourier coefficients are at four frequency points: $u_1 = [\alpha, 0]^T$, $u_2 = [0, \alpha]^T$, $u_3 = [\alpha, \alpha]^T$, and $u_4 = [\alpha, -\alpha]^T$ where a is a sufficiently small scalar. For example, in accordance with an exemplary embodiment, a=1/7 was used. The vector for each pixel is obtained as $$Fx = |F(u_1, x), F(u_2, x), F(u_3, x), F(u_4, x)|. \quad (5)$$

The phase information is recovered by a scalar quantizer, i.e., $$q_j(x) = \begin{cases} 1, & \text{if } g_j(x) \geq 0 \\ 0, & \text{otherwise} \end{cases}$$

where $q_j(x)$ is the jth component of the vector $G_x = |R_e\{F_x\}, Im\{F_x\}|$. The resulting eight binary coefficients $q_j(x)$ are represented as integer values between 0-255 using binary coding as follows:

$$f_{LPQ}(x) = \Sigma^*_{j=1} q_j(x) 2^{j-1} \quad (6)$$

In addition, the decorrelation process is added to the original LPQ implementation to eliminate the dependence among the neighboring pixels. Similar to LBP, the 200×200 face image were divided into size 20×20 regions. Therefore, the LPQ feature vector is of dimension 256×10×10=25600.

D. Classification

Figure 8:
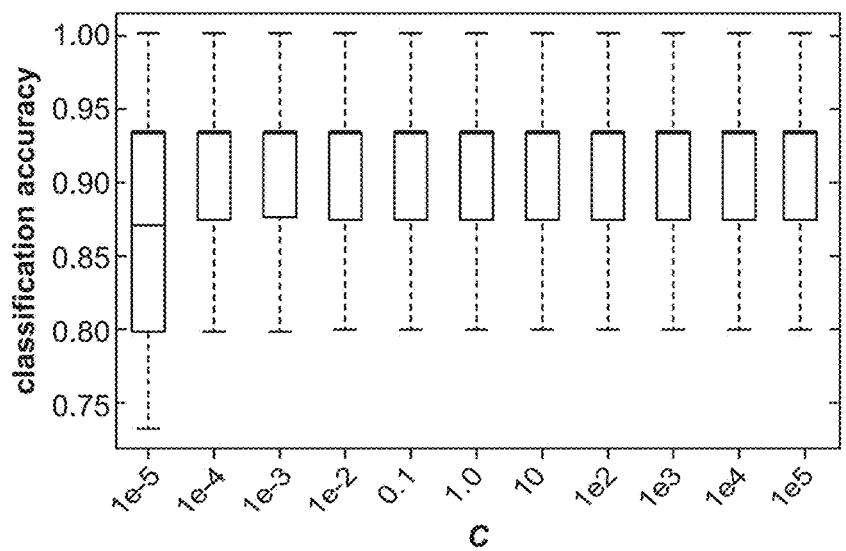
FIG. 8 shows a box plot of the tenfold cross-validation result on 155 GEMEP-FERA training data with respect to different values of the SVM parameter C.

In accordance with an exemplary embodiment, the multiclass linear SVM classifier was trained in the 1-versus-1 manner. The cost parameter C was chosen to be 1 for the system for the reason that, as demonstrated in FIG. 8, the tenfold cross-validation accuracy will not be degraded if C is not extremely small.

The iterative EAI algorithm is only executed during training. In the test phase, the detected faces using SIFT flow are registered with respect to the level-1 avatar reference obtained from the training phase. Summing up all the registered faces from one sequence generates the corresponding level-2 EAI. LBP and LPQ texture features are then extracted from every EAI representation for classification.

Figure 9:
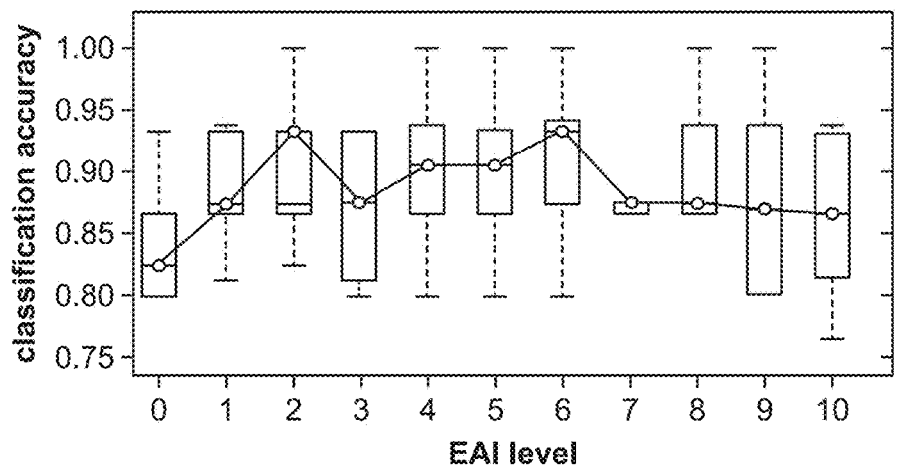
FIG. 9 shows a box plot of tenfold cross-validation results on 155 training videos using different levels of EAIs, and wherein the average classification rate is connected for the LPQ texture descriptor to show the improvement at each level, and which demonstrates adoption of level-2 EAIs because of its potential to good performance and relative computational efficiency.
Figure 10:
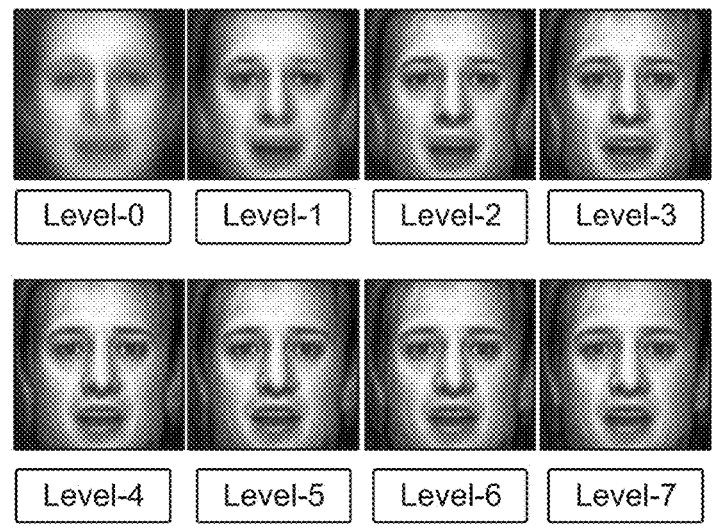
FIG. 10 shows an avatar reference from levels 0 to 7, and wherein a higher level of the avatar reference will have excessive facial details due to overfitting, and wherein level 1 is used in an embodiment.

The use of level-2 EAI face model is statistically demonstrated in FIG. 9. A series of tenfold cross-validation experiments were carried out on only the training of the GEMEP-FERA data set using the first 11 levels of the EAIs and the test on the LPQ texture descriptor. The cross-validation procedure results in person-specific category because the exemplary system did not exclude the test subjects from the training. In FIG. 9, it is shown that the performance improves as the level of the EAI increases for the first three levels. This is consistent with the disclose on the avatar reference level in Section III-B. The performance peaks at both levels 2 and 6. After analyzing the avatar reference and the corresponding EAI representation, the overfitting issue occurs to the avatar reference as the level increases, as shown in FIG. 10. Artifact facial details are excessively displayed through FIG. 10, the higher number of iteration in Algorithm 1. The system with level-6 EAI may not have a good generalization to unseen data.

IV. Experimental Results

A. System Implementation

In accordance with an exemplary embodiment, after extracting the faces from the raw data using the face detector using a robust real-time face detection method, the face images can then be aligned to the level-1 avatar reference face model based on Algorithm 1, and the single-representation EAIs are generated. Subsequently, using both LBP and LPQ operators, the feature from all the EAIs can be separately extracted. Specifically, $LBP_{S,1}^{u2}$ used in our experiment. The parameters for the LPQ operator are M=9, a=1/7, and p=0.9. Lastly, as demonstrated in Section III-D, the classifier can be the 1-versus-1 linear SVM classifier with C=1.

B. Challenge Evaluation Protocol

In accordance with an exemplary embodiment, the disclosed method and ten other methods, including a baseline method are compared using the FERA2011 data. i.e., the GEMEP-FERA data set [16]. As part of the FERA2011 challenge, 155 training videos were given out a month before the deadline. Then, the 134 test videos were released one week before the deadline. There are seven subjects in the training data and six subjects in the test set, three of which are not present in the training set. The test videos were run using our system that takes each video session as the input and outputs the emotion label. All predicted labels were then submitted to the organization panel of FERA2011. After evaluation, the results were provided in three different categories: person independent, person specific, and overall.

C. Challenge Results

The confusion matrices for the EAI using the LPQ operator are shown in FIGS. 27-29, with test results on person independent, person, specific, and overall respectively. Similarly, the confusion matrices for EAI using the LBP operator are presented in FIGS. 30-32.

Figure 11:
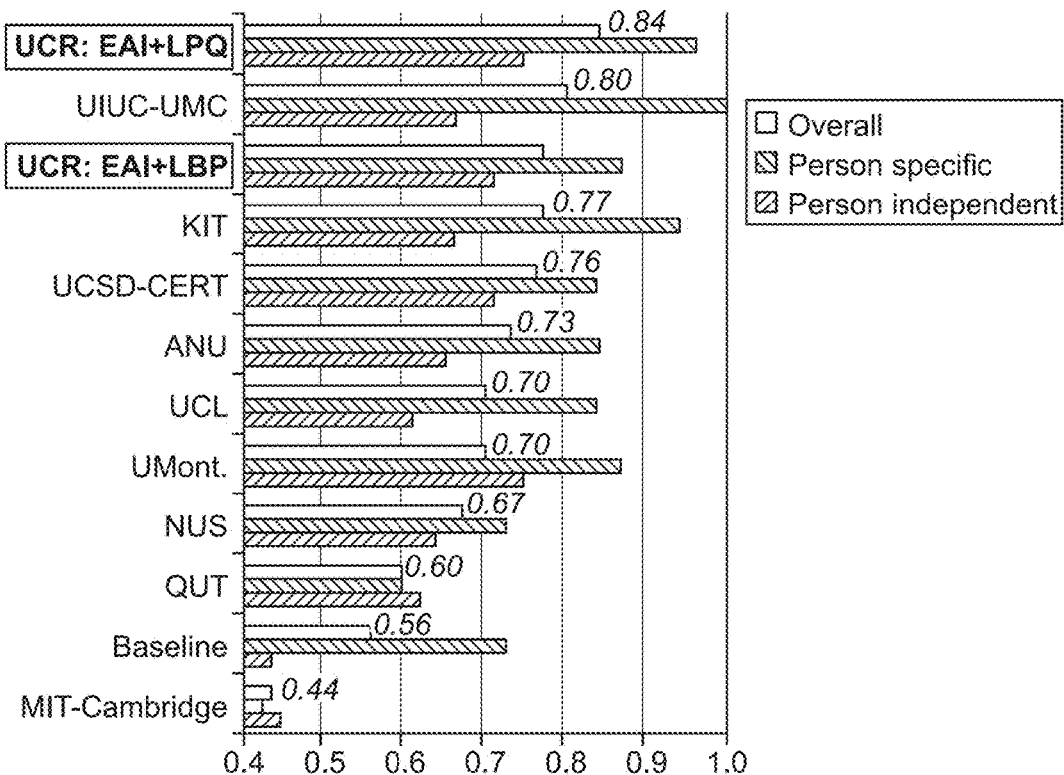
FIG. 11 shows a comparison of classification results in the primary test for person-specific, person-independent, and overall cases.

In FIG. 11, it is shown that EAI representation combined with LPQ and LBP descriptors rank the first and third places, respectively, in the primary test. Our approach achieves the highest classification rate in the person-independent test (0.75 using EAI+LPQ). This is positive evidence that the method and system as disclosed herein eliminates the person-specific information and captures the facial expression information. In addition, this demonstrates the desired ability of EAI for predicting the unseen data in real applications. In the person-specific test, our method achieves 96%, classification accuracy. In the training data, each subject displays the same expression three to five times. The EAI representation achieves consistency when a subject displayed the same expressions in different videos.

Since the ground-truth label for each emotion video is easy to tell the FERLA2011 organizer required a secondary test where no participant can see the data. The facial expansion recognition system program was submitted using EAI+LPQ to the organizer. Secondary test data are approximately half the size of the primary test set. For example, the method can achieve an 86% overall classification rate, which is consistent with the primary test.

The inherent characteristics of our approach is to eliminate facial dynamics while maintaining the emotion information. Unlike most of the other approaches, which treat each frame as a single training instance (total of 8995 frames from 155 videos if all the images in the training set are used), our method only considers them as 155 EAIs. Given more training videos, the system will most likely be improved since 155 videos of five emotions (approximately 30 videos/emotion on average) may not be sufficiently large to represent a single emotion across a large population.

D. Evaluation on the CK+ Data Set

For example, the system implemented with the combination of level-2 EAI and LPQ using 316 sequences from 23 subjects in the CK+ data set. Seven emotion categories (anger, contempt, digust, fear, happy, sadness, and suprise) are included in this data set. No subject with the same facial expression has been collected more than once. For example, one can carry out leave-one-subject-out cross-validation experiment so that it belongs to the person-independent category. The confusion matrix is shown in FIG. 33. The average classification accuracy is 82.6%, which is consistent with our person-independent lest result for the FERA data set in FIG. 27.

However, in accordance with an embodiment, the algorithm performance was not as good on this data set, which could be attributed to the following reasons. First, each sequence in the CK+ data set has only one apex, which reduces the intensity of the expression. The EAIs for CK+ look relatively neutral compared with the EAIs for the GEMEP-FERA data set. Second, the frontal view face images from the CK+ data set do not need sophisticated registration techniques. Thus, good dynamic facial features can be easily captured.

Figure 12:
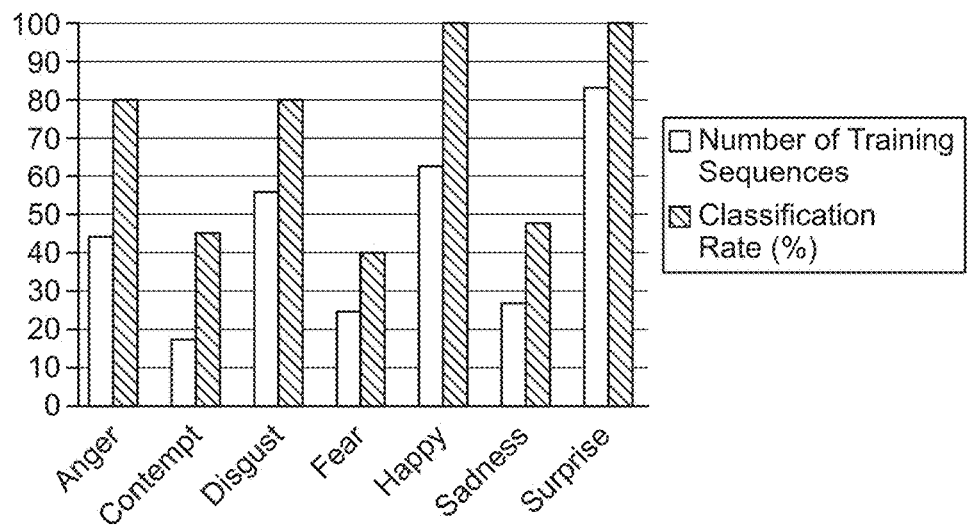
FIG. 12 shows the relation between the number of training images and the classification rate, and wherein the semantic meanings of the y-axis are different from the two classes, and the classification rates for categories with more training example are significantly higher.

However, in a more realistic case where a good registration result is difficult to achieve (such as the GEMEP-FERA), the EAI representation approach outperforms the approaches using complex dynamic features. Third, the training data might not be sufficient. For example, the relation between the number of training examples for each emotion category was plotted and the corresponding classification rate in FIG. 12. For classes Anger, Disgust, Happy, and Surprise, where training examples are greater than 40, the corresponding classification rate is significantly higher than that from the categories Contempt, Fear, and Sadness. For example, one can expect an improvement of performance for a larger number of training instances.

In more general cases such as spontaneous facial expression, facial feature motion is more subtle, and the temporal boundaries for expression are difficult to determine. As demonstrated in Section III, the registration process using SIFT flow can capture small changes in facial expressions if the changes are not extremely subtle. With respect to the temporal boundary issue, depending on application of the system, a facial expression can be segmented based on a single expression label or multiple labels. On the one hand, if a single-label assignment 100 is acceptable for an application, it is possible to sample the data based on the appearance change and to learn the temporal boundary. On the other hand, if the application needs to capture subtle information and multiple labels are required, one can consider learning the relation between different labels and the appearance feature.

In the process of developing a real-time system, several issues need to be addressed. The avatar reference can be created during the training phase. During the test phase, the detected faces are directly aligned with respect to the avatar reference using SIFT flow. As discussed in the previous paragraph, the EAIs can be computed given a temporal buffer resulting from the resampling process. The real question is that whether SIFT flow can be implemented in real time or not. The dense SIFT descriptor can be computed in a parallel fashion, whereas loopy belief propagation cannot. For example, if one can lower the face resolution from 200×200 (as used in this system) and sacrifice a small amount of the recognition rate, it is possible to carry out SIFT flow in real time.

Given the temporal segmentation of a video, for example, one can explore the new idea of condensing a video sequence into a single EAI representation. In accordance with an embodiment, SIFT flow was adopted for aligning the face images, which is able to compensate for large rigid head motion and maintain facial feature motion detail. Then, an iterative algorithm is used to generate an avatar reference face model onto which we align every face image. As disclosed herein, the method and system demonstrated that the level-2 EAI has the potential to generate a higher classification rate. For example, EAI representation combined with LPQ and LBP texture descriptors can achieve excellent performance in both person-independent and person-specific cases when tested on the challenging facial expression recognition data set, i.e., the GEMEP-FERA data set. Given the consistency of our EAI representation, the performance of the disclosed method and system is dramatically improved when compared with the baseline and other approaches.

As set forth above, recognizing faces in surveillance videos becomes difficult due to the poor quality of the probe data in terms of resolution, noise, blurriness, and varying lighting conditions. In addition, the poses in the probe data are usually not frontal view, as opposed to the standard format of the gallery data. The discrepancy between the two types of data makes the existing recognition algorithm far less accurate in real-world surveillance video data captured in a multi-camera network. In accordance with an exemplary embodiment, a multi-camera video based face recognition framework using a novel image representation called Unified Face Image (UFI) is disclosed, which is synthesized from multiple camera video feeds. Within a temporal window the probe frames from different cameras are warped towards a template frontal face and then averaged. The generated UFI representation is a frontal view of the subject that incorporates information from different cameras. Face super-resolution can also be achieved, if desired. For example, SIFT flow can be used as a high level alignment tool to warp the faces. Experimental results show that by using the unified face image representation, the recognition performance is better than the result of any single camera. The proposed framework can be adapted to any multi-camera video based face recognition using any face feature descriptors and classifiers.

With the wide deployment of surveillance video cameras, the necessity to perform robust face recognition in surveillance videos is rising for the purpose of for example, access control, security monitoring, etc. Although face recognition has been studied extensively, it is still very challenging for the existing face recognition algorithms to work accurately in real-world surveillance data. Empirical studies have shown that the face image of approximate size 64×64 is required for existing algorithms to yield good results. However, when a subject is not in the close vicinity of the camera, the captured face would have very low resolution. In addition, video sequences often suffer from motion blur and noise, together with changes in pose, lighting condition and facial expression. With the low resolution face images captured by surveillance cameras in different lighting conditions and poses, the recognition rate could drop dramatically to less than 10%.

The challenge of face recognition in surveillance video can be mainly due to the uncontrolled image acquisition process with the non-cooperative subject. The subject is often moving and it is not uncommon that only non-frontal view is captured, while in the gallery set often frontal view is stored. With multiple cameras in the surveillance system, each camera is likely to capture the face from different viewpoints. FIG. 13 shows sample probe data from 2 cameras (C1 and C2) and gallery data in the ChokePoint dataset]. Note that the appearance of the probe data is significantly different from the gallery data.

How to tackle the discrepancy between the probe and gallery data becomes critical in developing a robust recognition algorithm. In addition, how to utilize video inputs from multiple cameras to improve the recognition performance is also an essential part for face recognition in surveillance camera systems. In this chapter, a new image based face representation generated from multiple camera inputs is proposed to improve the recognition accuracy in real-world multi-camera surveillance data.

For example, for face recognition in video, a rough categorization divides different methods into two classes: 3D model based face recognition and 2D image based face recognition. Here some pointers are provided to the representative work.

To tackle the modality mismatch between the probe and the gallery data, a strategy is to build a 3D face model to handle varying poses. For example, a 3D morphable model can be generated as a linear combination of basis exemplars. A model can be fit to an input image by changing the shape and albedo parameters of the model. The drawback of the 3D based approach is the high computational cost. Zhang and Samaras combined spherical harmonics illumination representation with 3D morphable models. Aggarwal and Harguess used average half-face instead of the whole face to improve the face recognition accuracy for 3D faces. Barreto and Li proposed a framework for 3D face recognition system with variation of expression. The disadvantage for 3D based recognition is the high computational cost in building the 3D model. In addition, constructing a 3D model from low-resolution inputs is very difficult when the facial control points cannot be accurately localized by detectors.

To cope with the low-resolution issue in video based face recognition, Hennings Yeomans et al. used features from the face and super-resolution priors to extract a high-resolution template that simultaneously fits the super-resolution and face feature constraints. A generative model was developed in for separating the illumination and down-sampling effects to match a face in a low-resolution video sequence against a set of high resolution gallery sequences. Stallkamp et. al. introduced a weighting scheme to evaluate individual contribution of each frame in a video sequence. For example, face images with different modalities are projected into a common subspace for matching. Recently, Biswas et al. proposed a learning based likelihood measurement to match high-resolution gallery images with probe images from surveillance videos. The performance of these methods generally degrades when applied to real-world surveillance data. In addition, the learning based methods may not be viable due to the insufficient training data that are available in reality.

Additional effort has been made to recognize faces from different input resources. Normally a face captured from a single camera contains information of partial face only. To overcome this limitation, some approaches have been proposed that use multiple cameras to improve the recognition performance. A cylinder head model was built to first track and then fuse face recognition from multiple cameras. In addition, a reliability measure was trained and used to select the most reliable camera for recognition. A two-view face recognition system has also been proposed where the recognition results are fused using the Bayesian based approach. However, these approaches were validated only on videos of much higher resolution compared to the real-world surveillance data.

As a surveillance system often consists of multiple cameras, the multi-camera based face recognition approach is naturally desired. As disclosed herein, a framework for multi-camera video based face recognition by generating a new face image representation called Unified Face Image (UFI) is disclosed, which uses a set of multi-camera probe videos, and generates the UFI using several consecutive frames from each camera.

These frames are first warped towards a frontal face template and the warped images are then averaged to obtain the UFI. SIFT flow fill is used to warp the images. Given probe sequences from multiple cameras, only a few UFIs are needed to be extracted. The fusion is performed at the image level and the appearance of the generated UFIs is more coherent with the gallery data. The proposed framework can be used in any video based face recognition algorithms using different feature descriptors, classifiers or weighting schemes.

Technical Details

In this section the proposed framework for face recognition in surveillance videos is presented in accordance with an exemplary embodiment. FIGS. 14A-14E give an outline of an exemplary system. After the face images are extracted from the video sequences, the UFIs are generated by fusing these face images. A frontal view face template is used to warp the face images. The warping is achieved using SIFT flow. Before the classification, the generated UFIs are lighting normalized to eliminate the shading effects and non-uniform lighting conditions. Local Binary Pattern (LBP) is employed as the face descriptor. Before the disclosed UFI generation process, SIFT flow as the warping method is introduced.

SIFT Flow

SIFT flow was recently reported as an effective way to align images at the scene level SIFT flow is a dense matching algorithm that uses SIFT features to find the pixel-to-pixel correspondences between two images. For example, that scene pairs with high complexity can be robustly aligned. In the first step, SIFT features for every pixel are extracted. Then similar to optical flow, an energy function is minimized to match two images $s_1$ and $s_2$:

$$E(w) = \Sigma_p \min(||s_1(p) - (s_2(p+w(p))||_1, t) + \tag{7}$$

$$\Sigma_p \eta(|u(p)| + |v(p)|) + \tag{8}$$

$$\Sigma_{(p,q) \in \epsilon} \min(\alpha|u(p) - u(q)|, d) + \min(\alpha|v(p) - v(q)|, d) \tag{9}$$

where p is the image grid. $w(p) = (u(p), v(p))$ is the flow vector in horizontal and vertical direction at p. $\epsilon$ defines a local neighborhood (a four-neighborhood is used). The data term in (7) is a SIFT descriptor match constraint that enforces the match along the flow vector w(p). (8) is the small displacement constraint that ensures the flow vector w(p) to be as small as possible without additional information. The smoothness constraint is imposed in (9) for the pixels in the local neighborhood t and d are the thresholds for outliers and flow discontinuities. η and α are the scaling factors for the small displacement and smoothness constraint. In this energy function the truncated L1 norm is used in the data term and the smoothness term.

The dual-layer loopy belief propagation is used in the optimization process. Then, a coarse-to-fine SIFT flow matching scheme is applied to improve the matching result and the computation efficiency.

Figure 15:
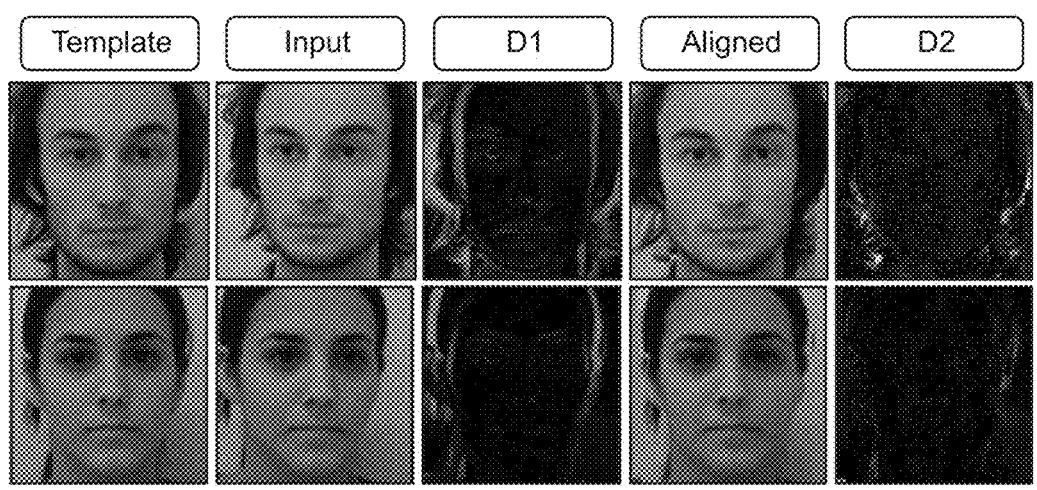
FIG. 15 shows a series of images using SIFT flow to align the input image with the template, and wherein D1 shows the difference between the template and the input image, and D2 shows the difference between the template and the aligned image, and wherein after SIFT flow alignment, the output image is very similar to the template image.

FIG. 15 illustrate the face alignment by SIFT flow. The input image is aligned towards the frontal view template. As can be seen, although the input images are not frontal face, the output image after alignment is very close to the frontal view. D1 shows the absolute difference between the template and the input image. D2 shows the absolute difference between the template and the aligned image. The difference in D2 is much smaller compared to the difference in D1 due to pose variation.

Unified Face Image (UFI) Generation

Figure 16:
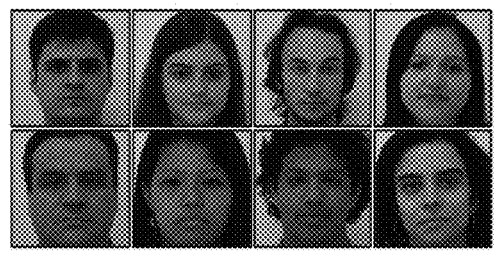
FIG. 16 shows a series of images from sample data from the FEI dataset.

After being extracted from the original sequence, the faces are used to generate the UFI. The face captured by the surveillance cameras are often not frontal view. Direct matching the non-frontal faces to the frontal view gallery data often lead to poor recognition results. To overcome this limitation, the face images were warped towards a common face template. The template $l_0$ is obtained by averaging the aligned frontal faces in the ChokePoint and the FEI datasets with 225 subjects in total, and by using the average face as the template, the approach avoided warping the face towards any specific subject. FIG. 16 shows some sample data from the FEI dataset.

Figure 17:
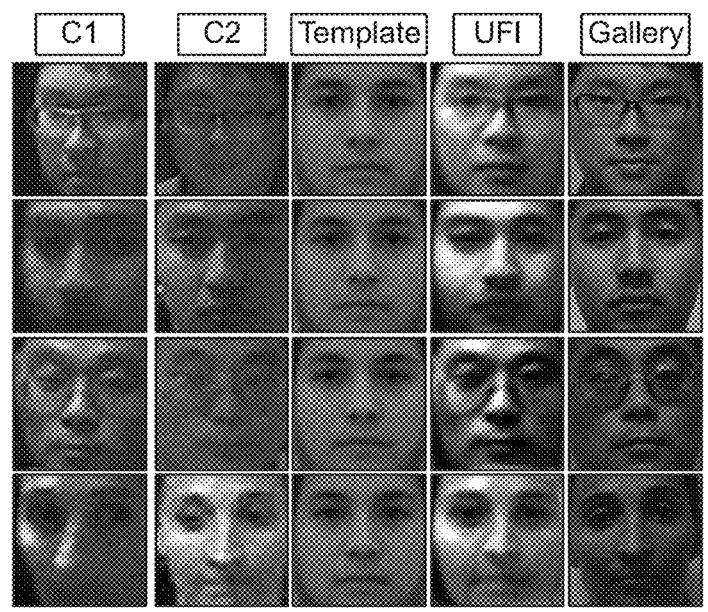
FIG. 17 shows a series of images wherein the UFI is generated from two camera inputs using the warping template, and C1 and C2 shows one of the frames in each camera used to generate the UFI, and the UFI is the frontal view of the subjects, which are very similar to the gallery data.

In a temporal window centered at time t, the UFI is generated as UFI(t)

$$UFI(t) = \frac{1}{(2k+1)C} \sum_{i=-k}^{k} \sum_{j=1}^{C} \langle l_j(t+i), l_0 \rangle$$

where $l_j(t+i)$ is the frame at time t+1 from camera j. C is the total number of cameras and 2k+1 is the length of the temporal window. $\langle l_j(t+i), l_0 \rangle$ warps $l_L(t+i)$ towards the template $l_0$ using SIFT flow. Since different cameras have different field of view, the information from each frame is complementary to each other. The averaging is essentially an information fusion process to aggregate all the information from different frames at different views. The generated UFI is a concise representation for all of the (2k+1)C frames. FIG. 17 shows some samples of the generated UFIs using faces from two cameras (C1 and C2).

As can be seen in FIG. 17, the generated UFIs are the frontal views of the subjects. The UFIs have less deviation from the gallery data in appearance. During this warping-averaging process, the noise and blurriness are suppressed and the facial details are enhanced. The UFI in the next temporal window is generated in the same manner.

Figure 18:
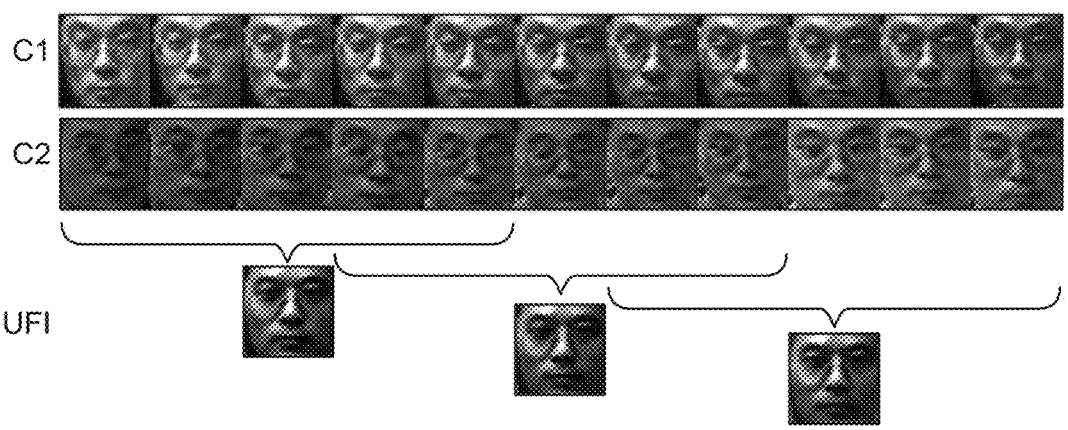
FIG. 18 shows a sample illustration of UFI generation in video sequences, and several UFIs are generated using a set of sequences from two cameras.

For a given set of video sequences from multiple cameras, the number of generated UFIs depends on the number of total frames in each sequence and the time step between two UFIs, given that the sequences from different cameras have the same length. FIG. 18 is a sample illustration of how the UFIs are generated from a set of sequences. The generated UFIs have similar appearance due to the overlap between the temporal windows, the small difference between frames, and the alignment process in which all the faces are aligned towards the same template. When the overlap between the adjacent temporal windows decreases or the video is captured at a lower frame rate, the variation between the UFTs would increase.

Recognition

Figure 19:
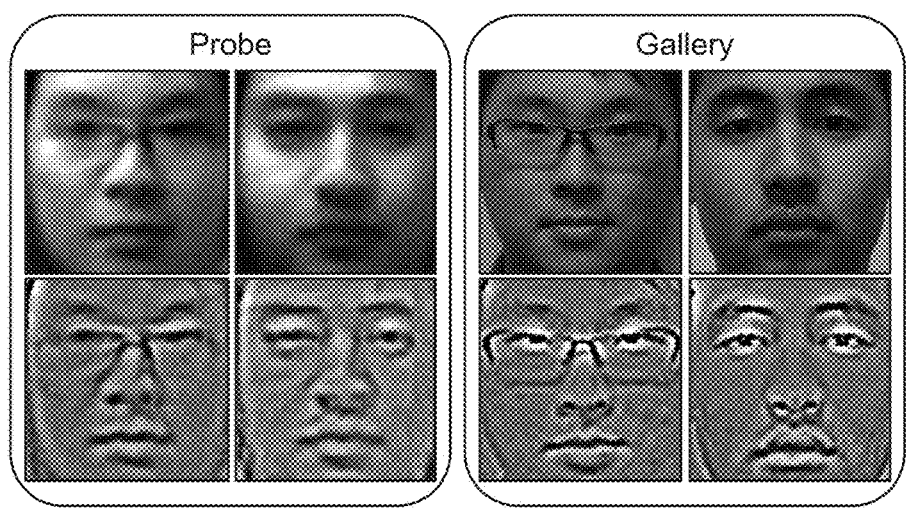
FIG. 19 shows a probe and gallery data before lighting normalization (top) and after lighting normalization (bottom).
Figure 20:
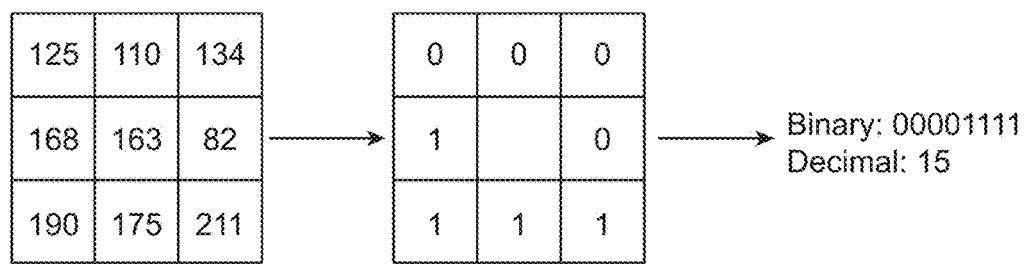
FIG. 20 shows a basic LBP descriptor generated from a 3×3 image patch.

Since the UFIs are generated from data of different cameras, the different lighting conditions in the original frames will introduce non-uniform lighting in UFIs (see FIG. 17). In order to reduce the lighting effects, a normalization method as disclosed in Tan, X, Triggs, B. *Enhanced local texture features sets for face recognition under difficult lighting conditions. Image Processing, IEEE Transactions on* 19(6). 1635-1650 (2010) was used to preprocess the UFIs. In accordance with an exemplary embodiment, the lighting normalization includes four steps. In the first step, the Gamma correction is performed to enhance the local dynamic range of the image. The second step involves Difference of Gaussian (DOG) filtering which has a band pass behavior to eliminate to shading effects. Then, the facial regions that are either irrelevant or too variable are masked out. In the final step the contrast equalization is applied to scale the image intensities. After the lighting normalization, the non-uniform lighting effects are eliminated. The faces in the gallery are processed similarly. FIG. 19 shows some sample results by lighting normalization.

After the lighting normalization, features from UFIs were extracted to match with the gallery image. There have been various face descriptors developed to encode the micro-pattern of face, such as local binary patterns (LBP), local phase quantization (LPQ), Gabor wavelets, patterns of oriented edge magnitudes (POEM), etc. In accordance with an embodiment, LBP was chosen as the face descriptor for its simplicity. The face image is divided into blocks and the LBP features are extracted from each block. The final feature vector of the race is obtained by concatenating these block features. Note that in the proposed framework any feature descriptors can be adopted.

For example, a nearest-neighbor (NN) classifier is applied. The Chi-square distance is used to compute the feature distance. The Chi-square distance between two histograms M and N is computed by $$\chi^2(M, N) = \sum_i \frac{(M_i - N_i)^2}{M_i + N_i}$$

The distance scores are accumulated for all the UFIs generated from the original set of sequences and the lowest summed score across all the gallery images provides the identity of the subject. Each UFI is considered equally important yet any frame weighting scheme can be applied to the UFIs to further improve the recognition performance.

Experiments

Dataset and Settings

In accordance with an embodiment, the ChokePoint dataset, which is designed for evaluating face recognition algorithms under real-world surveillance conditions. A subset of the video sequences from portal 1 (P1) in two directions (Entering and Leaving) and two cameras (C1 and C2) are used (P1E_S1_C1, P1E_S1_C2, P1E_S2_C1, P1E_S2_C2, P1E_S3_C1, P1E_S3_C2, P1E_S4_C1, P1E_S4_C2, P1L_S1_C1, P1L_S2_C2, P1L_S2_C1, P1L_S2_C2, P1L_S3_C1, P1L_S3_C2, P1L_S4_C1, P1L S4_C2). In accordance with an embodiment, a total of 25 subjects were involved. The gallery set contains the high-resolution frontal faces of the 25 subjects. In addition, a subset of the video sequences from portal2 (P2) in one direction (Leaving) and two cameras (C1 and C2) are used (P2L_S1_C1, P2L_S1_C2, P2_S2_C1I, P2L_S2_C2, P2L_S3_C1, P2L_S3_C2, P2L_S4_C1I, P2L_S4_C2). In accordance with an embodiment, images from P2E were not used due to insufficient data. In portal 2 there were 29 subjects. The extracted faces are provided with the dataset.

The probe faces are normalized to 64×64. For example, for each sequence, the initial 20 frames are chosen to form a challenging problem where the subjects were far away from the cameras. To generate UFI at the current frame, its previous and future 4 frames and itself are used (when the previous or future frame are not available, its mirror image with respect to the current frame is used, for example, l(t+1) is used when l(t−1) is not available. In accordance with an exemplary embodiment, one could use 4 UFIs generated from the 20 frames at every fifth frame. For example, the default parameters as provided in the implementation of Tan, X, Triggs, B. Enhanced local texture features sets for face recognition under difficult lighting conditions. Image Processing, IEEE Transactions on 19(6). 1635-1650 (2010). DOI 10.1109/TIP.2010.2042645 can be used to normalize the lighting effects. $LBP_{8,2}^{u2}$ is used as suggested in Ahonen, T. Hadid, A., Pietikainen, M.: Face recognition with local binary patterns. In European Conference on Computer Vision, pp. 469-481 (2004). The image block size is chosen as 16×16.

Experimental Results

To focus on the recognition improvement using UFIs generated from multiple camera data, the results were compared to the baseline method where each original probe frame in a single camera is used to match with the gallery images. The distance score for each frame is summed across the 20 frames in the sequence and the final identity is taken as the one with the lowest total score. The ChokePoint dataset were not directly compared to other systems where a video-to-video verification protocol is used. Rather, the video-to-video verification protocol can be used. The video-to-image recognition in this disclosure is more challenging due to the significant data discrepancy between the probe and the gallery data.

FIG. 34 is a table showing the rank-1 recognition rates in portal 1 and FIG. 35 is a table showing the rank-1 recognition rates in portal 2. Compared to the recognition rates from individual cameras, the proposed new face representation improves the recognition rate remarkably in all but one set or the testing sequences (P1L-2). On average, the recognition rate using UFI is 17% higher than the result by camera 1 and 24.5% higher than the result by camera 2 in portal 1, and the improvements rise to 39.66% and 28.45% respectively in portal 2. The reason for the improved recognition performance is that by using UFIs as the new probe data, the discrepancy between the appearance of the probe data and the gallery data is reduced. By fusing the information from two cameras, the recognition result can be superior to a single camera.

Figure 21:
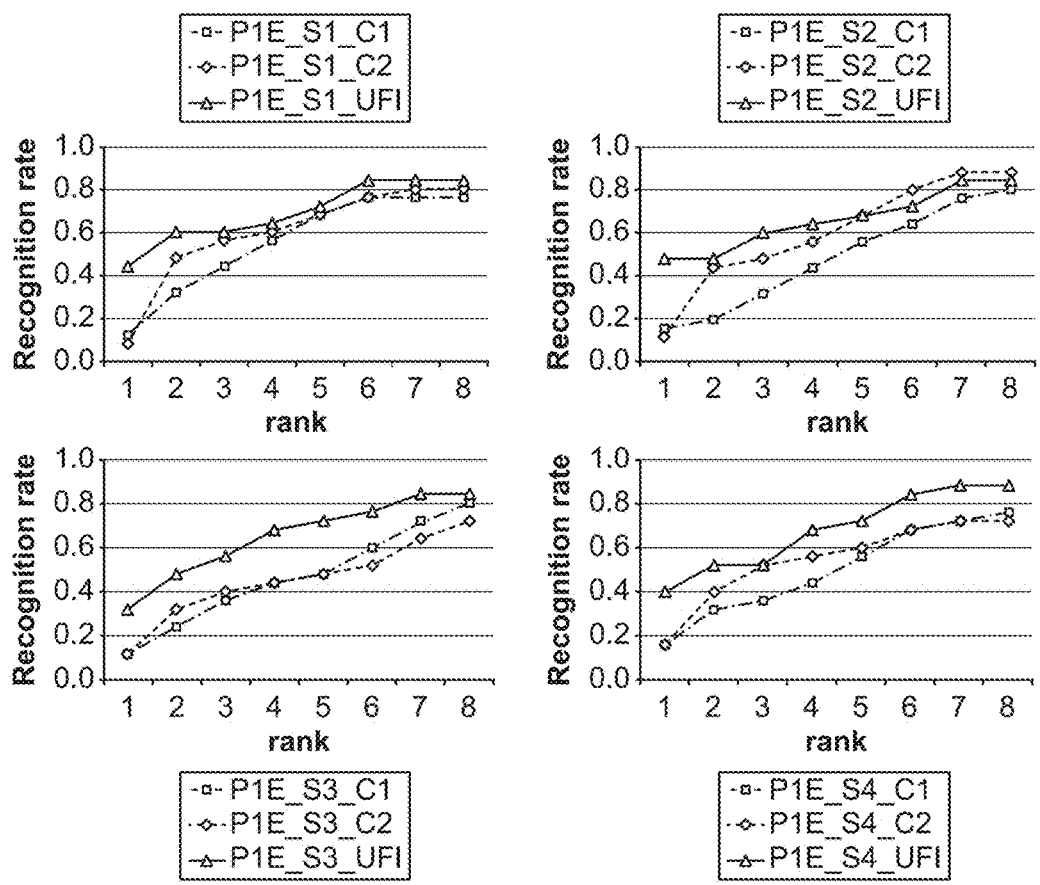
FIG. 21 shows the cumulative match curves for the testing sequences in portal 1, when the subjects are entering the portal (P1E).
Figure 22:
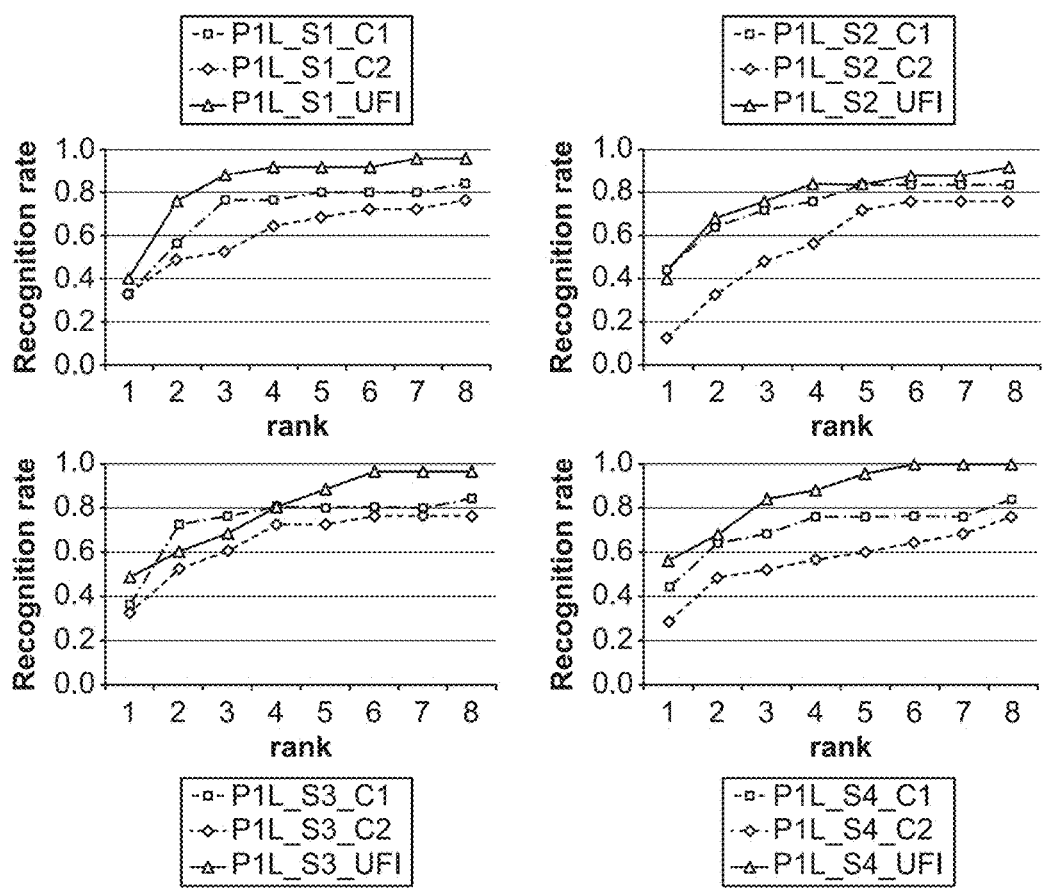
FIG. 22 shows the cumulative match curves for the testing sequences in portal 1, when the subjects are leaving the portal (P1L).

The cumulative match curves (CMC) are given in FIG. 21, FIG. 22 and FIG. 23 for sequences in P1E, P1L and P2L respectively. In general the recognition rates at different ranks are higher by using the proposed UFIs which congregate the useful face information from different cameras. The fusion achieved at the image level enables the easy adoption of different feature descriptors or classifiers. Moreover, no training or complex modeling is required.

A significant challenge for face recognition from surveillance videos is the mismatch between the frontal view gallery data and diverse appearance in the probe data. For example, to overcome this limitation and to utilize the information from multiple cameras, a novel image representation called Unified Face Image (UFI) by fusing the face images from different cameras is disclosed. The face images are aligned towards a frontal view template using SIFT flow algorithm. The generated UFI is the frontal view of the subject. In this way the complementary information from multiple cameras is effectively combined. Given multiple video sequences as inputs, a few UFIs are generated for the subsequent recognition purpose. The experimental results on a public surveillance video based dataset indicate that by using the UFIs, the recognition rate is significantly improved compared to the recognition result from any single camera. The proposed method is simple yet effective and any feature descriptors, weighting schemes or classifiers can be easily adopted in this framework.

Vehicle Logo Super-Resolution System

Recognition of a vehicle make is of interest in the fields of law enforcement and surveillance. In accordance with an exemplary embodiment, a canonical correlation analysis (CCA) based method is developed for vehicle logo super-resolution to facilitate the recognition of the vehicle make. From a limited number of high-resolution logos, the training dataset for each make is populated using gamma transformations. Given a vehicle logo from low-resolution source (i.e., surveillance or traffic camera recordings), the learned models yield super-resolved results. By matching the low-resolution image and the generated high-resolution images, the final output that is closest to the low-resolution image in the histogram of oriented gradients (HOG) feature space is selected. Experimental results show that the method and system outperforms the state-of-the-art super-resolution methods in qualitative and quantitative measures. Furthermore, the super-resolved logos help to improve the accuracy in the subsequent recognition tasks The vehicle logo super-resolution algorithm can consist of two steps. In the training step, for each make, a set of HR and LR logo image pairs is used to learn a model that maximize their correlation in the CCA subspace. To test a LR image, each model will produce an output and the final output that is selected based on the one that is closest to the input LR image in the histogram of oriented gradients (HOG) feature space. Before delving into the details of the method, a brief review of CCA is disclosed.

Canonical Correlation Analysis (CCA)

CCA finds basis vectors for two sets of random variables such that the correlation between the projections of these two sets of random variables is maximized. Given two centered (zero mean) datasets, $X=\{x_i \in R^m, i=1, 2, \ldots N\}$ and $Y=\{y_i \in R^n, i=1, 2, \ldots, N\}$, CCA aims at obtaining two basis vectors $W_x \in R^m$ and $W_y \in R^n$ such that the correlation coefficient p of $W_X^T X$ and $W_Y^T Y$ is maximized.

For example, to evaluate the disclosed SR method, 15 LR logos for each make were collected from a surveillance camera recording from a highway. In the video, the vehicles are viewed from the rear. As soon as the license plate (LP) of a vehicle is detected, a region of interest (ROI) of size 4LP height×LP width immediately above the LP is selected. The ROI is segmented to detect and crop the logos automatically. The LR logos are normalized to the same size as those in the training set.

Vehicle Logo Super-Resolution

The results were compared to bicubic interpolation and three state-of-the-art methods: kernel regression based SR (KR), iterative curve based interpolation (ICBI), and adaptive sparse domain selection based SR (ASDS). Default parameters are used in these methods. Note that in the proposed method it is not necessary to know the blurring kernel. The input LR logo images suffering from severe noise and blurriness due to the low quality of the surveillance images. Also strong specular reflection is present due to highly reflective surface of the logos. In this scenario, the improvement from bicubic interpolation to ICBI is not explicit and all the image artifacts are retained. KR performs better in noise reduction. However the super-resolved results are oversmoothed and no high-frequency details are compensated to generate sharp outputs. Although ASDS recovers some details, the noise in the LR images is also exaggerated. The proposed method performs significantly better than the other methods and the details are faithfully reconstructed with the elimination of noise, specularities and blurriness. The results also suggest that to super-resolve highly structural images, manifold learning based method is superior compared to other kinds of approaches.

Since the original HR images for the detected logos were not available, the quantitative measures used for comparison are non-reference based. For example, three measures can be used: the first is the distortion measure (DM) that evaluates the image quality in the frequency domain; the second metric is based on the anisotropy (ANIS), which correlates well to the classical reference based metrics such as PSNR, and third, applying a proposed metric of Cumulative Probability of Blur Detection (CPBD) that focuses on the image sharpness evaluation. FIG. 36 shows the average scores using different metrics.

For example, as shown in FIG. 36, the results by the method and system yield highest scores for all the metrics. In accordance with an exemplary embodiment, all the LR images are super-resolved correctly using HOG as the output selection measure. Despite the poor LR image quality due to artifacts such as specularities, noise and blurriness, HOG successfully differentiates makes using gradient information which is not sensitive to the image degradation.

Effects on Vehicle Logo Recognition

One of the motivations for logo SR is to improve the performance of the subsequent recognition. The super-resolved images are used by different methods as inputs to different classifiers. FIG. 37 shows logo recognition performance. The recognition performance of HOG and PCA compressed features combined with nearest neighbor and linear SVM classifier were compared. While the recognition performance improves marginally between the other SR methods, the disclosed method significantly improves the recognition accuracies irrespective of the feature or the classifier used.

The average size of the detected LR logo images used in the experiments was 26×46. FIG. 38 shows the effects of further downsampling the LR logos on recognition accuracy. In accordance with an exemplary embodiment, the recognition performance can deteriorate with reduced resolution. As the structural details of the logos differ and are affected by lower resolution differently, the recognition performance varies significantly among different makes.

In this disclosure, a manifold learning based super-resolution method for vehicle logos is developed. HR and LR logos are first projected into PCA subspace and canonical correlation analysis (CCA) is applied to create another subspace where the coherence between the projected PCA coefficients of the HR and LR image pairs is enhanced. For each vehicle make a specific model is learned. Given a low-resolution image, it is projected into the CCA subspace and its K nearest neighbors in the CCA subspace of the HR images can be used to reconstruct the super-resolved image.

The methods and systems as disclosed herein can be processed on one or more computer or processing devices having a memory, a processor, an operating system and/or software and/or an optional graphical user interface (GUI) and/or display.

The invention is not limited, however, to the embodiments and variations described above and illustrated in the drawing figures. Various changes, modifications and equivalents could be effected by one skilled in the art without departing from the spirit and scope of the invention as defined in the appended claims. It is expressly intended that all such changes, modifications and equivalents which fall within the scope of the claims are embraced by the claims.

What is claimed is:

1. A method for unified face representation for individual recognition in surveillance videos, comprising:
extracting facial images from two or more video streams of data;
generating a unified face image (UFI) from the two or more video streams of data by fusing the extracted facial images using a frontal face template to warp the facial images from the two or more video streams of data; and
generating the unified facial image (UFI) in a temporal window, and wherein the unified facial image is generated as UFI(t), where $$UFI(t) = \frac{1}{(2k+1)C} \sum_{i=-k}^{k} \sum_{j=1}^{C} \langle I_j(t+i), I_0 \rangle$$

where $I_j(t+i)$ is the frame at time t+i from camera j, C is the total number of cameras and 2k +1 is the length of the temporal window, and $\langle I_j(t+i), I_0 \rangle$ warps $I_j(t+i)$ towards the template $I_0$ using SIFT flow alignment.

2. The method of claim 1, further comprising:
extracting the facial images from the two or more video streams of data using a Viola and Jones face detector.

3. The method of claim 1, further comprising:
resizing a facial resolution of the detected facial images using bicubic interpolation.

4. The method of claim 1, further comprising:
performing a texture descriptor on the unified face image.

5. The method of claim 4, wherein the texture descriptor is a local binary pattern (LBP).

6. The method of claim 4, wherein the texture descriptor is blur-insensitive local phase quantization (LPQ) descriptor.

7. The method of claim 1, comprising:
generating each of the two or more video streams from a different video camera.

8. The method of claim 1, comprising:
performing lighting normalization on the unified facial image (UFO) to eliminate shading effects and non-uniform lighting conditions.

9. The method of claim 8, wherein the lighting normalization comprises:
performing a Gamma correction to enhance a local dynamic range of the unified facial image (UFI);
applying a Difference of Gaussian (DOG) filtering which has a band pass behavior to eliminate to shading effects;

masking facial regions that are either irrelevant or too variable; and applying a contrast equalization to scale image intensities.

10. The method of claim 1, comprising:

classifying the unified facial image by applying a nearest-neighbor classifier.

11. The method of claim 10, wherein the nearest-neighbor classifier further comprises:

using a Chi-square distance to compute a feature distance, and wherein the Chi-square distance between two histograms M and N is computed by $$x^2(M, N) = \sum_i \frac{(M_i - N_i)^2}{M_i + N_i}.$$

12. The method of claim 10, comprising:

identifying a subject based on the classification.

13. A method for unified face representation for individual recognition in surveillance videos, comprising:

generating two of more video streams of data, each of the two more video streams of data being generated from a different video camera;

extracting facial images from the two or more video streams of data;

generating a unified face image (UFI) from the two or more video streams of data by fusing the extracted facial images using a frontal face template to warp the facial images from the two or more video streams of data using SIFT flow alignment; and generating the unified facial image (UFI) in a temporal window, and wherein the unified facial image is generated as UFI(t), where $$UFI(t) = \frac{1}{(2k+1)C} \sum_{i=-k}^{k} \sum_{j=1}^{C} \langle I_j(t+i), I_0 \rangle$$

where $I_j(t+i)$ is the frame at time t+i from camera j, C is the total number of cameras and 2k +1 is the length of the temporal window, and $\langle I_j(t+1), I_0 \rangle$ warps $I_L(t+i)$ towards the template $I_0$ using the SIFT flow alignment.

14. The method of claim 13, comprising:

performing lighting normalization on the unified facial image (UFO) to eliminate shading effects and non-uniform lighting conditions.

15. The method of claim 14, wherein the lighting normalization comprises:

performing a Gamma correction to enhance a local dynamic range of the unified facial image (UFI);

applying a Difference of Gaussian (DOG) filtering which has a band pass behavior to eliminate to shading effects;

masking facial regions that are either irrelevant or too variable; and applying a contrast equalization to scale image intensities.

16. The method of claim 13, comprising:

classifying the unified facial image by applying a nearest-neighbor classifier; and identifying a subject based on the classification.

17. The method of claim 16, wherein the nearest-neighbor classifier further comprises:

using a Chi-square distance to compute a feature distance, and wherein the Chi-square distance between two histograms M and N is computed by $$x^2(M, N) = \sum_i \frac{(M_i - N_i)^2}{M_i + N_i}.$$

* * * * *